United States Patent
Miyaki et al.

(10) Patent No.: US 11,273,717 B2
(45) Date of Patent: Mar. 15, 2022

(54) OPEN CABIN VEHICLE

(71) Applicant: YAMAHA HATSUDOKI KABUSHIKI KAISHA, Iwata (JP)

(72) Inventors: Mutsuaki Miyaki, Iwata (JP); Dai Sudou, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 254 days.

(21) Appl. No.: 16/751,196

(22) Filed: Jan. 23, 2020

(65) Prior Publication Data

US 2020/0238839 A1 Jul. 30, 2020

(30) Foreign Application Priority Data

Jan. 25, 2019 (JP) .............................. JP2019-011463

(51) Int. Cl.
| | |
|---|---|
| *B60K 15/07* | (2006.01) |
| *H01M 8/24* | (2016.01) |
| *B60L 50/71* | (2019.01) |
| *H01M 8/2475* | (2016.01) |
| *B60K 15/03* | (2006.01) |
| *B60K 15/063* | (2006.01) |

(52) U.S. Cl.
CPC .............. *B60L 50/71* (2019.02); *B60K 15/07* (2013.01); *H01M 8/2475* (2013.01); *B60K 2015/03315* (2013.01); *B60K 2015/0638* (2013.01); *B60Y 2400/102* (2013.01); *H01M 2250/20* (2013.01)

(58) Field of Classification Search
CPC .................... B60L 50/71; B60K 15/07; B60K 2015/03315; B60K 2015/0638; B60Y 2400/102; H01M 8/2475; H01M 2250/20
See application file for complete search history.

(56) References Cited

U.S. PATENT DOCUMENTS

| | | | | |
|---|---|---|---|---|
| 10,870,361 | B2* | 12/2020 | Hara .................. | H01M 8/04201 |
| 2002/0060100 | A1* | 5/2002 | Nagura ................ | B60K 15/063 180/65.1 |
| 2005/0093287 | A1* | 5/2005 | Kondo ..................... | B60K 1/04 280/834 |
| 2014/0224562 | A1* | 8/2014 | Ozawa ............. | B60K 15/03006 180/291 |

FOREIGN PATENT DOCUMENTS

JP     2010125110 A     6/2010

* cited by examiner

*Primary Examiner* — John D Walters
(74) *Attorney, Agent, or Firm* — Rabin & Berdo, P.C.

(57) ABSTRACT

An open cabin vehicle is equipped with a fuel cell unit having a hydrogen tank for storing hydrogen to be used as fuel and has a simple structure. An upper end of each of a hydrogen tank, a fuel cell stack, and a hydrogen supply pipe is located farther upward than a floor in a state in which the hydrogen tank, the fuel cell stack, and the hydrogen supply pipe are disposed in a fuel-cell-unit arrangement space which is provided below a space being present farther backward than at least a part of the floor in a vehicle-body inner space, and which borders the vehicle-body inner space, thereby being connected to a vehicle-body outer space which is a space around the open cabin vehicle, via the vehicle-body inner space.

19 Claims, 20 Drawing Sheets

OPEN CABIN VEHICLE

TECHNICAL FIELD

The present teaching relates to an open cabin vehicle, and more particularly to an open cabin vehicle including a fuel cell unit including a hydrogen tank, a fuel cell stack, and a hydrogen supply pipe connecting those.

BACKGROUND ART

Conventionally, open cabin vehicles are known. An open cabin vehicle is disclosed in, for example, Japanese Patent Application Publication No. 2010-125110.

The open cabin vehicle described in the above described publication includes a vehicle body and an electric motor. The vehicle body includes a floor which is formed to lead to an entrance having no door, and a roof which is disposed farther upward than the floor. The vehicle body forms a vehicle-body inner space. The vehicle-body inner space is defined at an upper end by the roof, and is capable of accommodating an occupant and/or a luggage. The vehicle-body inner space is communicated with a vehicle-body outer space. The vehicle-body outer space is a space around the vehicle body. The electric motor provides driving force to the vehicle body.

Since the open cabin vehicle described in the above described publication has no door at the entrance, the degree of freedom in designing the entrance increases. Also, as a result of that the floor is leaded to the entrance having no door, and the vehicle-body inner space which is formed by the vehicle body is communicated with the vehicle-body outer space which is a space around the vehicle body, an opened vehicle-body inner space is provided. In addition, since an electric motor instead of an internal combustion engine is adopted as a driving source to provide driving force to the vehicle body, exhaust pipes and the like, which are required when an internal combustion engine is adopted, are obviated. Therefore, the open cabin vehicle described in the above described publication allows to realize a simple structure.

CITATION LIST

Patent Literature

Patent Literature 1: Japanese Patent Application Publication No. 2010-125110

SUMMARY OF INVENTION

Technical Problem

Recently, a proposal has been made to equip a fuel cell unit having a hydrogen tank for storing hydrogen to be used as fuel on an automobile having a body in which a door is provided at its entrance. Accordingly, it is required to equip a fuel cell unit having a hydrogen tank for storing hydrogen to be used as fuel even on an open cabin vehicle having a simple structure as described above.

An object of the present teaching is to provide an open cabin vehicle which is equipped with a fuel cell unit having a hydrogen tank for storing hydrogen to be used as fuel, and which has a simple structure.

Solution to Problem

To achieve the above described object, the inventors of the present application have investigated the configuration of a fuel cell unit having a hydrogen tank. As a result, it has been found that a fuel cell unit includes a hydrogen tank, a fuel cell stack, and a hydrogen supply pipe for connecting those.

Next, the present inventors have investigated the arrangement of the fuel cell unit having a hydrogen tank. As a result, the inventors have obtained the following findings.

When equipping a fuel cell unit having a hydrogen tank on an open cabin vehicle, a countermeasure against a case in which accidental leakage of hydrogen occurs (hereinafter, referred to as countermeasure against hydrogen leakage) is required. Further, regarding the countermeasure against hydrogen leakage, predetermined technical regulations have to be satisfied. In other words, when fuel cell unit having a hydrogen tank is equipped on an open cabin vehicle, it is necessary to configure the hydrogen tank, the fuel cell stack, and a hydrogen pipe for connecting those in consideration of the countermeasure against hydrogen leakage and such that the countermeasure satisfies predetermined technical regulations.

Accordingly, the present inventors have investigated the countermeasure against hydrogen leakage. As a result, it has been found that, as the countermeasure against hydrogen leakage, there are two types of countermeasures: (1) a countermeasure against leakage of hydrogen from the fuel cell unit, and (2) a countermeasure against increase in the concentration of leaked hydrogen in case accidental leakage of hydrogen from the fuel cell unit occurs.

Based on such findings, the present inventors have conducted further investigation. Specifically, further investigation is conducted focusing on the above described countermeasure of (2). As a result, the following findings have been obtained.

To restrict increase in the concentration of leaked hydrogen in case accidental leakage of hydrogen from the fuel cell unit occurs, it is conceivable, for example, to dispose the hydrogen tank, the fuel cell stack, and the hydrogen supply pipe for connecting those, in a distributed manner. More specifically, it is conceivable to dispose the hydrogen tank and the fuel cell stack in separate spaces.

However, disposing the hydrogen tank, the fuel cell stack, and the hydrogen supply pipe for connecting those, in a distributed manner will require a countermeasure against hydrogen leakage for each of the hydrogen tank, the fuel cell stack, and the hydrogen supply pipe for connecting those. Specifically, countermeasures against hydrogen leakage need to be taken such as by modifying the structure surrounding each of the hydrogen tank, the fuel cell stack, and the hydrogen supply pipe for connecting those. As a result, it will become difficult to simplify the structure in an open cabin vehicle equipped with a fuel cell unit having a hydrogen tank.

Then, the present inventors investigated how to dispose the hydrogen tank, the fuel cell stack, and the hydrogen supply pipe for connecting those, in a distributed manner by taking advantage of an originally simple structure of an open cabin vehicle. As a result, it has been found that an open cabin vehicle which has an originally simple structure has a structure in which hydrogen is not likely to stay farther backward than at least a part of its floor, and therefore the hydrogen tank, the fuel cell stack, and the hydrogen supply pipe for connecting those may be disposed farther backward than at least the part of the floor of the open cabin vehicle in a collective manner, without being distributed. The present teaching has been completed based on such a finding.

An open cabin vehicle according to one embodiment of the present teaching includes a vehicle body and an electric motor. The vehicle body includes a floor and a roof. The floor is formed to lead to an entrance having no door. The roof is disposed farther upward than the floor. The vehicle body forms a vehicle-body inner space. The vehicle-body inner space has an upper end defined by the roof. The vehicle-body inner space can accommodate an occupant and/or a luggage. The vehicle-body inner space is open to the vehicle-body outer space. The vehicle-body outer space is a space around the vehicle body. The electric motor provides driving force to the vehicle body.

An open cabin vehicle according to an embodiment of the present teaching further includes a fuel cell unit and a fuel-cell-unit-arrangement-space forming wall part. The fuel cell unit includes a hydrogen tank, a fuel cell stack, and a hydrogen supply pipe. The hydrogen tank stores hydrogen. The fuel cell stack uses hydrogen stored in the hydrogen tank as fuel. The hydrogen supply pipe connects the hydrogen tank with the fuel cell stack. The fuel cell unit generates electric power to be supplied to the electric motor. The fuel-cell-unit-arrangement-space forming wall part forms a fuel-cell-unit arrangement space. The hydrogen tank, the fuel cell stack, and the hydrogen supply pipe are disposed in the fuel-cell-unit arrangement space. The fuel-cell-unit arrangement space is provided below a space being present farther backward than at least a part of the floor in the vehicle-body inner space. The fuel-cell-unit arrangement space is connected to the vehicle-body inner space. Thereby, the fuel-cell-unit arrangement space communicates with the vehicle-body outer space, which is a space around the vehicle body, via the vehicle-body inner space. To form such a fuel-cell-unit arrangement space, the fuel-cell-unit-arrangement-space forming wall part is disposed so as to surround the hydrogen tank, the fuel cell stack, and the hydrogen supply pipe, which are disposed in the fuel-cell-unit arrangement space, as viewed in an upward direction or a downward direction of the open cabin vehicle.

In an open cabin vehicle according to one embodiment of the present teaching, the upper end of each of the hydrogen tank, the fuel cell stack, and the hydrogen supply pipe is located farther upward than the floor in a state in which the hydrogen tank, the fuel cell stack, and the hydrogen supply pipe are disposed in the fuel-cell-unit arrangement space, that is, a space which is provided below a space being present farther backward than at least a part of the floor in the vehicle-body inner space, and which is communicated with the vehicle-body inner space, thereby being communicated with the vehicle-body outer space which is a space around the vehicle body, via the vehicle-body inner space.

In an open cabin vehicle according to one embodiment of the present teaching, it is possible to dispose the hydrogen tank, the fuel cell stack, and the hydrogen supply pipe for connecting those by taking advantage of an originally simple structure of the open cabin vehicle. For that reason, even when a fuel cell unit having a hydrogen tank is equipped, it is possible to simplify the structure of the open cabin vehicle.

An open cabin vehicle according to one embodiment of the present teaching will not be particularly limited provided that it has a space which is opened to the outside, that is, the surrounding of the open cabin vehicle and whose upper end is defined by the roof, as a space in which an occupant and/or a luggage is accommodated. The open cabin vehicle may be, for example, one movable on the ground, one movable on the water, or one movable in the air. An open cabin vehicle which is movable on the ground is, for example, a car. The car has, for example, at least one wheel. An open cabin vehicle which is movable on the water is, for example, a ship. An open cabin vehicle which is movable in the air is, for example, a helicopter or a drone. An open cabin vehicle may be, for example, one which is movable by being operated by an occupant, or one which is movable without being operated by an occupant (that is, capable of automatic or autonomous driving).

In an open cabin vehicle according to one embodiment of the present teaching, the vehicle body will not be particularly limited provided that it has a floor and a roof. The floor will not be particularly limited provided that it is formed to lead to an entrance having no door. An aspect in which the floor is formed to lead to the entrance includes, for example, an aspect in which the lower end of the entrance is defined by the floor as viewed in the left ward direction or rightward direction of the open cabin vehicle. Here, the floor is a portion of the vehicle body, which has a floor surface with which an occupant and/or a luggage is contactable. Therefore, if a region used originally as a floor surface becomes uncontactable with an occupant and/or a luggage as a result of a structural object such as a seat being disposed, the portion having the concerned region (the region used originally as a floor surface) is excluded from the floor. Therefore, the floor may possibly be divided, for example, in the front-back direction of the open cabin vehicle. The roof will not be particularly limited provided that it is disposed farther upward than the floor. The vehicle body will not be particularly limited provided that it forms a vehicle-body inner space. The vehicle-body inner space will not be particularly limited provided that its upper end is defined by the roof. In other words, the vehicle-body inner space includes a space overlapping the roof as viewed in the upward direction or the downward direction of the open cabin vehicle. The vehicle-body inner space will not be particularly limited provided that it can accommodate an occupant and/or a luggage. The vehicle-body inner space will not be particularly limited provided that it is a space communicated with the vehicle-body outer space. In other words, the vehicle-body inner space may be any space opened to the outside. An aspect in which the vehicle-body inner space is communicated with the vehicle-body outer space includes, for example, an aspect in which the vehicle-body inner space is communicated with the vehicle-body outer space through an entrance, and an aspect in which the vehicle-body inner space is communicated with the vehicle-body outer space through an opening other than the entrance. The vehicle-body outer space will not be particularly limited provided that it is a space around the vehicle body. The entrance will not be particularly limited provided that it is formed at the vehicle body. The entrance may be singular or plural.

In an open cabin vehicle according to one embodiment of the present teaching, the electric motor will not be particularly limited provided that it gives driving force to the vehicle body. At least a part of the electric motor may be disposed in, for example, the fuel-cell-unit arrangement space. The electric motor is, for example, a three-phase AC motor.

In an open cabin vehicle according to one embodiment of the present teaching, the fuel cell unit will not be particularly limited provided that it includes a hydrogen tank, a fuel cell stack, and a hydrogen supply pipe. The hydrogen tank will not be particularly limited provided that it can store hydrogen which serves as fuel. The fuel cell stack will not be particularly limited provided that it can generate electric power to be supplied to the electric motor by using hydrogen stored in the hydrogen tank as fuel. The fuel cell stack includes, for example, a plurality of cells. Each of the plurality of cells includes, for example, a membrane electrode assembly (MEA). The membrane electrode assembly includes, for example, two electrodes (a fuel electrode and an air electrode) and an electrolyte. The two electrodes are each obtained by adhering a catalyst to supporting current collector. The supporting current collector is formed of, for example, a porous material. The catalyst is formed of, for example, platinum. The electrolyte is a polymer film that serves a function of ionic conduction. The hydrogen supply pipe will not be particularly limited provided that it can supply hydrogen stored in the hydrogen tank to the fuel cell stack. The hydrogen supply pipe will not be particularly limited provided that it connects the hydrogen tank with the fuel cell stack. The hydrogen supply pipe may include, for example, a first hydrogen supply pipe that allows hydrogen to flow from a hydrogen filling port to the hydrogen tank, and a second hydrogen support pipe that allows hydrogen to flow from the hydrogen tank to the fuel cell stack.

In an open cabin vehicle according to one embodiment of the present teaching, the fuel-cell-unit-arrangement-space forming wall part will not be particularly limited provided that it forms a fuel-cell-unit arrangement space in which a hydrogen tank, a fuel cell stack, and a hydrogen supply pipe are disposed. The fuel-cell-unit-arrangement-space forming wall part will not be particularly limited provided that it is disposed so as to surround the hydrogen tank, the fuel cell stack, and the hydrogen supply pipe as viewed in the upward direction or the downward direction of the open cabin vehicle. An aspect in which the fuel-cell-unit-arrangement-space forming wall part surrounds the hydrogen tank, the fuel cell stack, and the hydrogen supply pipe as viewed in the upward direction or the downward direction of the open cabin vehicle includes, for example, an aspect in which at least a part of the fuel-cell-unit-arrangement-space forming wall part overlaps at least a part of each of the hydrogen tank, the fuel cell stack, and the hydrogen supply pipe as viewed in any of the frontward direction, the backward direction, the leftward direction, and the rightward direction of the open cabin vehicle. The fuel-cell-unit-arrangement-space forming wall part surrounds, for example, the hydrogen tank, the fuel cell stack, and the hydrogen supply pipe on every side as viewed in the upward direction or the downward direction of the open cabin vehicle. The fuel-cell-unit-arrangement-space forming wall part includes, for example, as viewed in the upward direction or the downward direction of the open cabin vehicle, (A) a front wall part which is disposed in front of the hydrogen tank, the fuel cell stack, and the hydrogen supply pipe, (B) a back wall part which is disposed behind the hydrogen tank, the fuel cell stack, and the hydrogen supply pipe, (C) a left wall part which is disposed to the left of the hydrogen tank, the fuel cell stack, and the hydrogen supply pipe, and (D) a right wall part which is disposed to the right of the hydrogen tank, the fuel cell stack, and the hydrogen supply pipe. The front wall part, the back wall part, the left wall part, and the right wall part may be disposed, for example, such that two adjacent wall parts are connected, or such that two adjacent wall parts are not connected. The front wall part, the back wall part, the left wall part, and the right wall part may be disposed, for example, such that a gap is formed between two adjacent wall parts, or such that no gap is formed between two adjacent wall parts. For example, at least a part of the fuel-cell-unit-arrangement-space forming wall part may be formed of a vehicle body, or formed of a member other than the vehicle body. An aspect in which the hydrogen tank, the fuel cell stack, and the hydrogen supply pipe are disposed in the fuel-cell-unit arrangement space includes, for example, an aspect in which the whole of each of the hydrogen tank, the fuel cell stack, and the hydrogen supply pipe is disposed in the fuel-cell-unit arrangement space, and an aspect in which at least a part of each of the hydrogen tank, the fuel cell stack, and the hydrogen supply pipe is disposed in the fuel-cell-unit arrangement space. The hydrogen tank, the fuel cell stack, and the hydrogen supply pipe may be disposed in the fuel-cell-unit arrangement space as viewed in the upward direction or the downward direction of the open cabin vehicle. In other words, at least a part of each of the hydrogen tank, the fuel cell stack, and the hydrogen supply pipe may be disposed outside the fuel-cell-unit arrangement space as viewed in the leftward direction or the rightward direction of the open cabin vehicle.

In an open cabin vehicle according to one embodiment of the present teaching, the fuel-cell-unit arrangement space which is formed by the fuel-cell-unit-arrangement-space forming wall part will not be particularly limited provided that it is a space which is connected with the vehicle-body inner space at a position farther backward than at least a part of the floor. The aspect in which the fuel-cell-unit arrangement space is connected with the vehicle-body inner space includes: an aspect in which they are connected in the up-down direction of the open cabin vehicle; an aspect in which they are connected in the left-right direction of the open cabin vehicle; and an aspect in which they are connected in the front-back direction of the open cabin vehicle. The fuel-cell-unit arrangement space may be connected with the vehicle-body inner space at a position farther backward than at least a part of the floor in the direction in which the open cabin vehicle moves. Therefore, for example, when the open cabin vehicle is a car which can move in a first direction and a second direction which is the opposite direction to the first direction (that is, a car capable of switching back), the fuel-cell-unit arrangement space may be connected with the vehicle-body inner space at a position farther frontward than at least a part of the floor when the open cabin vehicle moves in the first direction or in the second direction. The fuel-cell-unit arrangement space may be connected with the vehicle-body inner space through, for example, a level of gap through which hydrogen can pass. The fuel-cell-unit arrangement space may be formed by utilizing a space which is originally the vehicle-body inner space. In other words, the fuel-cell-unit-arrangement-space forming wall part which forms the fuel-cell-unit arrangement space may be formed by utilizing the vehicle body. This makes it possible to easily connect the fuel-cell-unit arrangement space with the vehicle-body inner space.

In an open cabin vehicle according to one embodiment of the present teaching, at least one of the hydrogen tank, the fuel cell stack, and the hydrogen supply pipe may have its lower end located farther upward than the floor.

In such aspect, it is possible to lower the floor.

In an open cabin vehicle according to one embodiment of the present teaching, a lower end of each of the hydrogen tank, the fuel cell stack, and the hydrogen supply pipe may be located farther upward than the floor.

In such aspect, it is possible to lower the floor.

An open cabin vehicle according to one embodiment of the present teaching, may further include a seat. The seat is disposed farther upward than the floor and is to be seated by an occupant. In an open cabin vehicle including such a seat, the fuel-cell-unit arrangement space may be formed farther backward than a portion of the floor with which a foot of the occupant seated in the seat is contactable.

In such aspect, since the fuel-cell-unit arrangement space can be formed by utilizing a space behind the seat, it becomes easy to provide a space for forming the fuel-cell-unit arrangement space.

In an open cabin vehicle including the above described seat, at least one of the hydrogen tank, the fuel cell stack, and the hydrogen supply pipe may be disposed below the seat.

In such aspect, it is possible to dispose at least one of the hydrogen tank, the fuel cell stack, and the hydrogen supply pipe by making good use of a dead space below the seat.

In an open cabin vehicle including the above described seat, at least one of the fuel cell stack and the hydrogen supply pipe may be disposed below the seat.

In such aspect, the space below the seat may be smaller compared to a case in which the hydrogen tank is disposed below the seat.

In an open cabin vehicle including the above described seat, the hydrogen tank may be disposed farther backward than the seat.

In such aspect, it is easy to provide a space for disposing the hydrogen tank. Therefore, it is possible to adopt a larger hydrogen tank.

In an open cabin vehicle including the above described seat, an upper end of the hydrogen tank may be located farther upward than a seating part of the seat in which an occupant is seated.

In such aspect, it is easy to form a space below the hydrogen tank.

An open cabin vehicle according to one embodiment of the present teaching may further include a cover. The cover is disposed above the hydrogen tank to allow the fuel-cell-unit arrangement space and the vehicle-body inner space to be connected with each other.

In such aspect, it is possible to restrict the hydrogen tank from being exposed to the outside. Further, since communication between the fuel-cell-unit arrangement space and the vehicle-body inner space is allowed, just in case accidental leakage of hydrogen occurs, the leaked hydrogen becomes more likely to be diffused from the fuel-cell-unit arrangement space to the vehicle-body outer space via the vehicle-body inner space.

The aspect in which the cover allows connection between the fuel-cell-unit arrangement space and the vehicle-body inner space includes, for example: an aspect in which the connection between the fuel-cell-unit arrangement space and the vehicle-body inner space is allowed via a communication hole formed in the cover; and an aspect in which the connection between the fuel-cell-unit arrangement space and the vehicle-body inner space is allowed via a gap formed between the cover and the fuel-cell-unit-arrangement-space forming wall part.

An open cabin vehicle according to one embodiment of the present teaching may further include a wheel. The wheel is rotated by power being transferred thereto from the electric motor.

In an open cabin vehicle including the above described wheel, an upper end of the hydrogen tank may be located farther upward than the wheel as viewed in the leftward direction or the rightward direction of the open cabin vehicle.

In such aspect, it is possible to provide a space below the hydrogen tank.

In an open cabin vehicle including the above described wheel, a lower end of the hydrogen tank may be located farther upward than the wheel as viewed in the leftward direction or the rightward direction of the open cabin vehicle In such aspect, it is possible to provide a larger space below the hydrogen tank.

In an open cabin vehicle including the above described wheel, the hydrogen tank may be located above the wheel as viewed in the leftward direction or the rightward direction of the open cabin vehicle.

In such aspect, it is possible to dispose the hydrogen tank near the wheel in the front-back direction of the open cabin vehicle.

In an open cabin vehicle including the above described wheel, a front end of the hydrogen tank may be located farther frontward than the rear end of the wheel, and located farther backward than the front end of the wheel.

In such aspect, it is possible to dispose the hydrogen tank near the wheel in the front-back direction of the open cabin vehicle.

In an open cabin vehicle including the above described wheel, an upper end of the wheel may be located farther upward than the floor as viewed in the leftward direction or the rightward direction of the open cabin vehicle.

In such aspect, it is possible to dispose the floor near the ground.

In an open cabin vehicle including the above described wheel, the wheel may be a rear wheel which is disposed at a rear part of the open cabin vehicle.

An open cabin vehicle according to another embodiment of the present teaching includes a vehicle body and an electric motor. The vehicle body includes a floor which is formed to lead to an entrance having no door. The electric motor provides driving force to the vehicle body.

An open cabin vehicle according to another embodiment of the present teaching further includes a fuel cell unit and a fuel-cell-unit-arrangement-space forming wall part. The fuel cell unit includes a hydrogen tank for storing hydrogen, a fuel cell stack which uses as fuel the hydrogen stored in the hydrogen tank, and a hydrogen supply pipe which connects the hydrogen tank with the fuel cell stack. The fuel cell unit generates electric power to be supplied to the electric motor. The fuel-cell-unit-arrangement-space forming wall part is disposed so as to surround the hydrogen tank, the fuel cell stack, and the hydrogen supply pipe which are disposed in the fuel-cell-unit arrangement space as viewed in the upward direction or the downward direction of the open cabin vehicle, for forming a fuel-cell-unit arrangement space in which the hydrogen tank, the fuel cell stack, and the hydrogen supply pipe are disposed, in which the fuel-cell-unit arrangement space is provided below a space being present continuous with a space above the floor in the front-back direction of the open cabin vehicle, and overlapping with the open cabin vehicle as viewed in a downward direction of the open cabin vehicle, and is connected with a space around the vehicle body. It is noted that the fuel-cell-unit arrangement space may be provided farther backward than the floor.

In an open cabin vehicle according to another embodiment of the present teaching, an upper end of each of the hydrogen tank, the fuel cell stack, and the hydrogen supply pipe is located farther upward than the floor in a state in which the hydrogen tank, the fuel cell stack, and the hydrogen supply pipe are disposed in a fuel-cell-unit arrangement space which is provided below a space being present continuous with a space above the floor in the front-back direction of the open cabin vehicle, and overlapping with the open cabin vehicle as viewed in a downward direction of the open cabin vehicle, and which is connected with the space around the vehicle body.

In an open cabin vehicle according to another embodiment of the present teaching, it is possible to dispose the hydrogen tank, the fuel cell stack, and the hydrogen supply pipe for connecting those by taking advantage of an originally simple structure of the open cabin vehicle. For that reason, it is possible to simplify the structure of the open cabin vehicle even when a fuel cell unit having a hydrogen tank is equipped thereon.

The above described purposes and other purposes, features, aspects, and benefits of the present teaching will become further apparent from the following detailed description of embodiments of the present teaching which is to be presented in association with the appended drawings.

As used herein, the term "and/or" includes any and all combinations of one or more of the associated listed items.

The terms "including," "comprising" or "having" and variations thereof, when used in this specification, specify the presence of stated features, steps, operations, elements, components, and/or their equivalents but do not preclude the presence or addition of one or more other features, steps, actions, elements, components, and/or groups thereof.

Unless otherwise defined, all terms (including technical and scientific terms) used herein have the same meaning as commonly understood by one having ordinary skill in the art to which the present teaching belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the present teaching, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the present teaching and the claims.

In the following description, for purposes of explanation, numerous specific details are set forth in order to provide a thorough understanding of the present teaching. It will be evident, however, to one skilled in the art that the present teaching may be practiced without these specific details. The present disclosure is to be considered as an exemplification of the present teaching, and is not intended to limit the present teaching to the specific embodiments illustrated by the figures or description below.

Advantageous Effects of Invention

According to the present teaching, it is possible to provide an open cabin vehicle which is equipped with a fuel cell unit having a hydrogen tank, and has a simple structure.

DESCRIPTION OF EMBODIMENTS

Hereinafter, with reference to the drawings, open cabin vehicles according to embodiments of the present teaching will be described in detail. Note that the embodiments to be described below are merely examples. The present teaching should not be interpreted as being limited to the embodiments to be described below.

Figure 1:
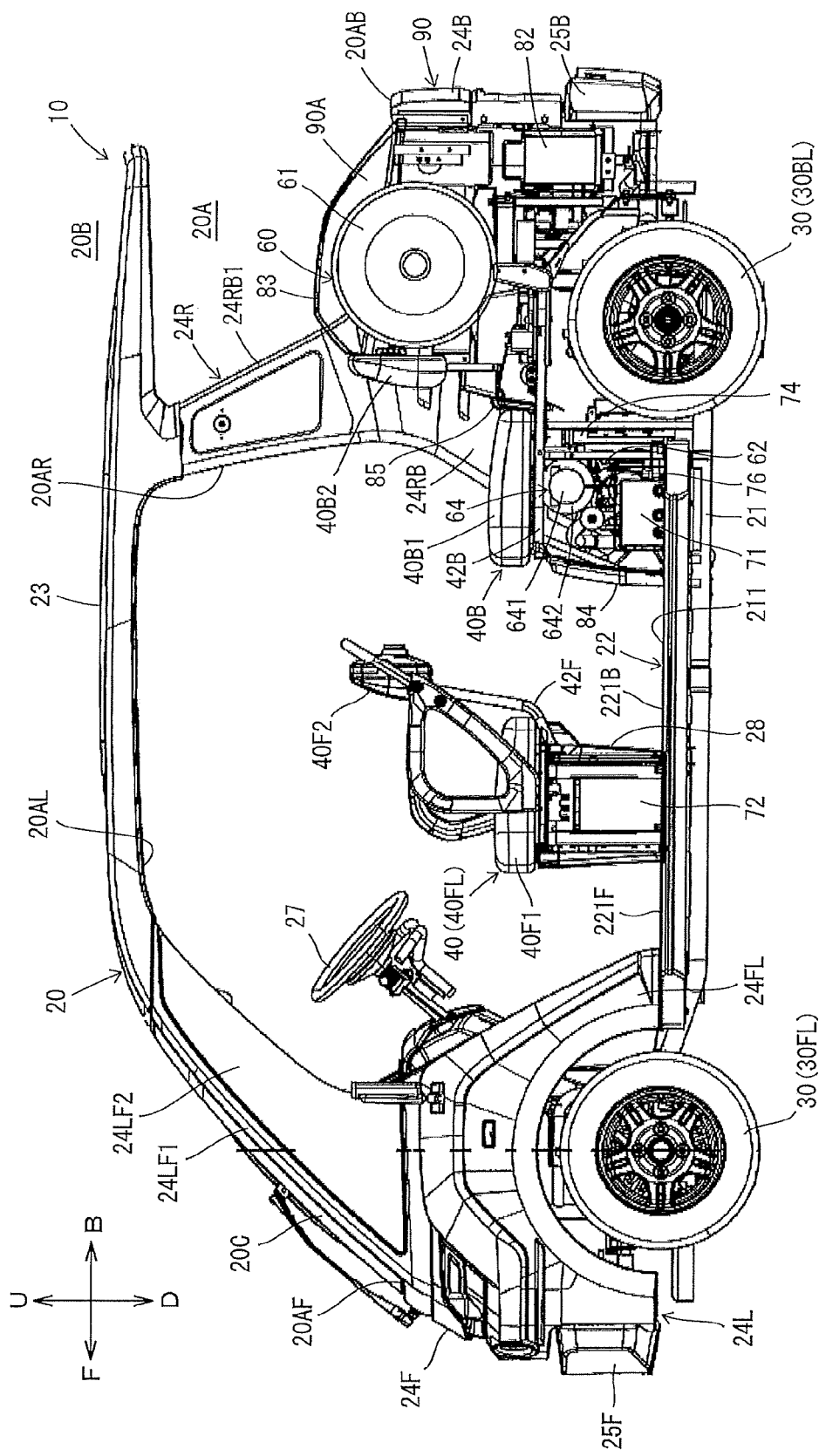
FIG. 1 is a left side view of an open cabin vehicle according to an embodiment of the present teaching, in which the interior of the open cabin vehicle is made visible in a see-through left side view.
Figure 2:
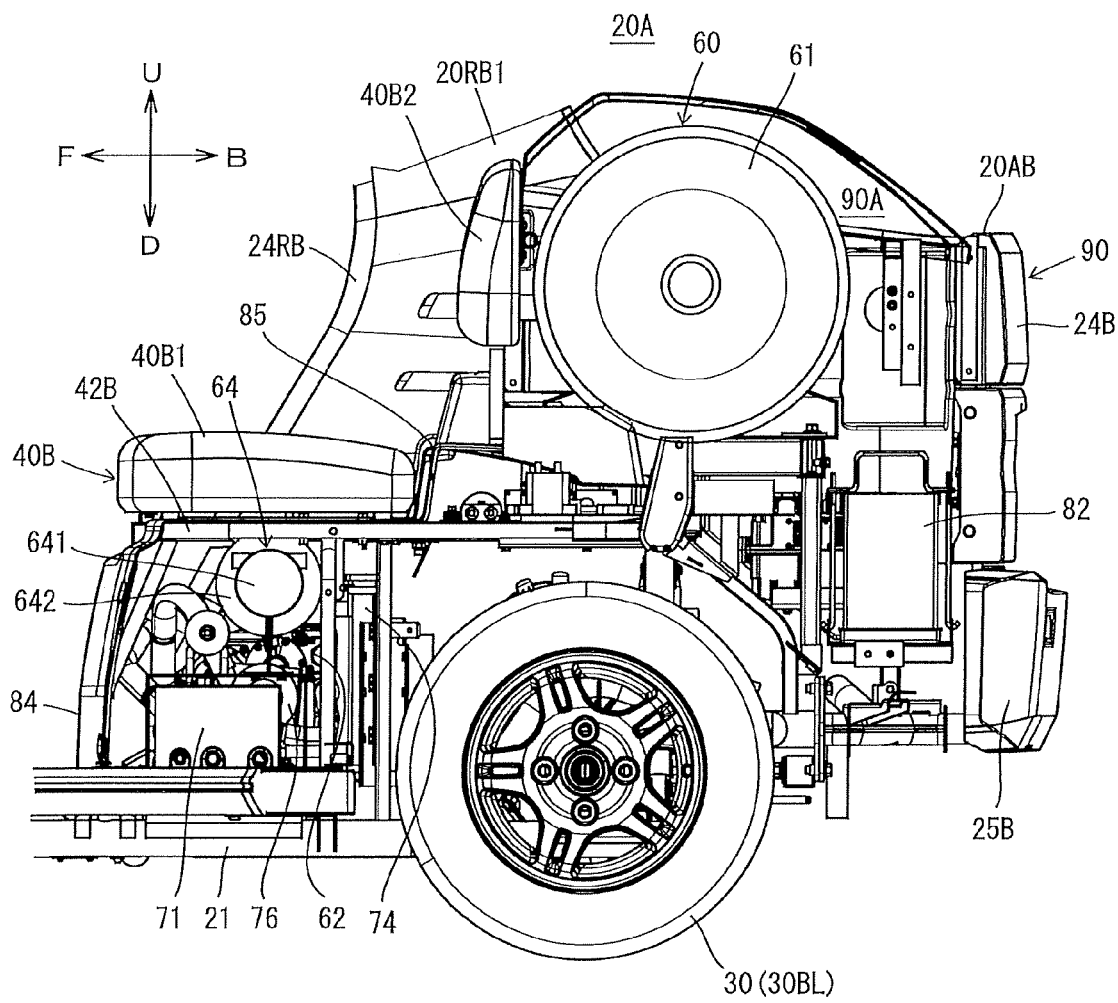
FIG. 2 is an enlarged view to show a part of FIG. 1.
Figure 3:
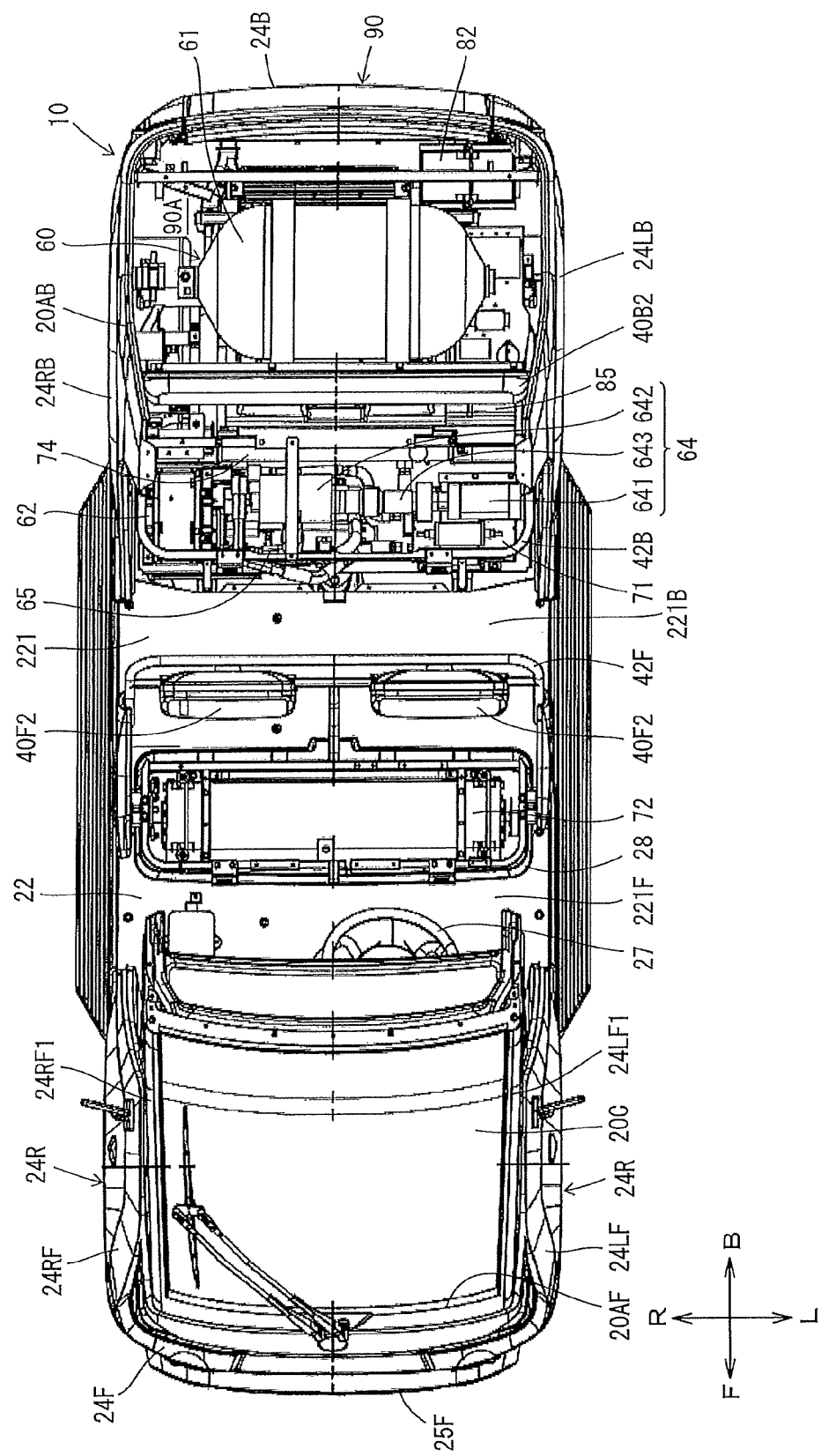
FIG. 3 is a plan view of an open cabin vehicle according to an embodiment of the present teaching, in which the interior of the open cabin vehicle is made visible in a see-through plan view.
Figure 4:
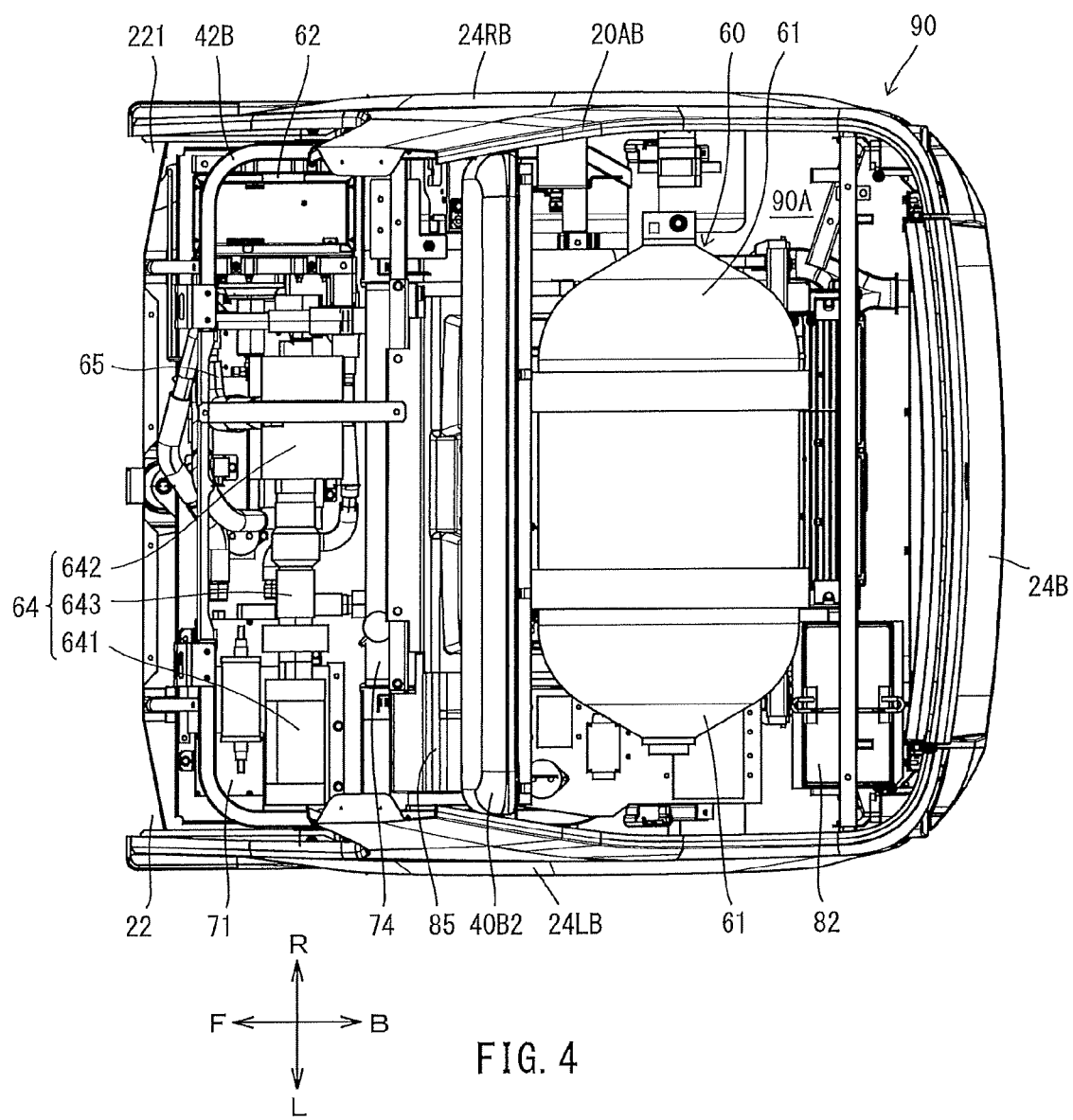
FIG. 4 is an enlarged view to show a part of FIG. 3.
Figure 5:
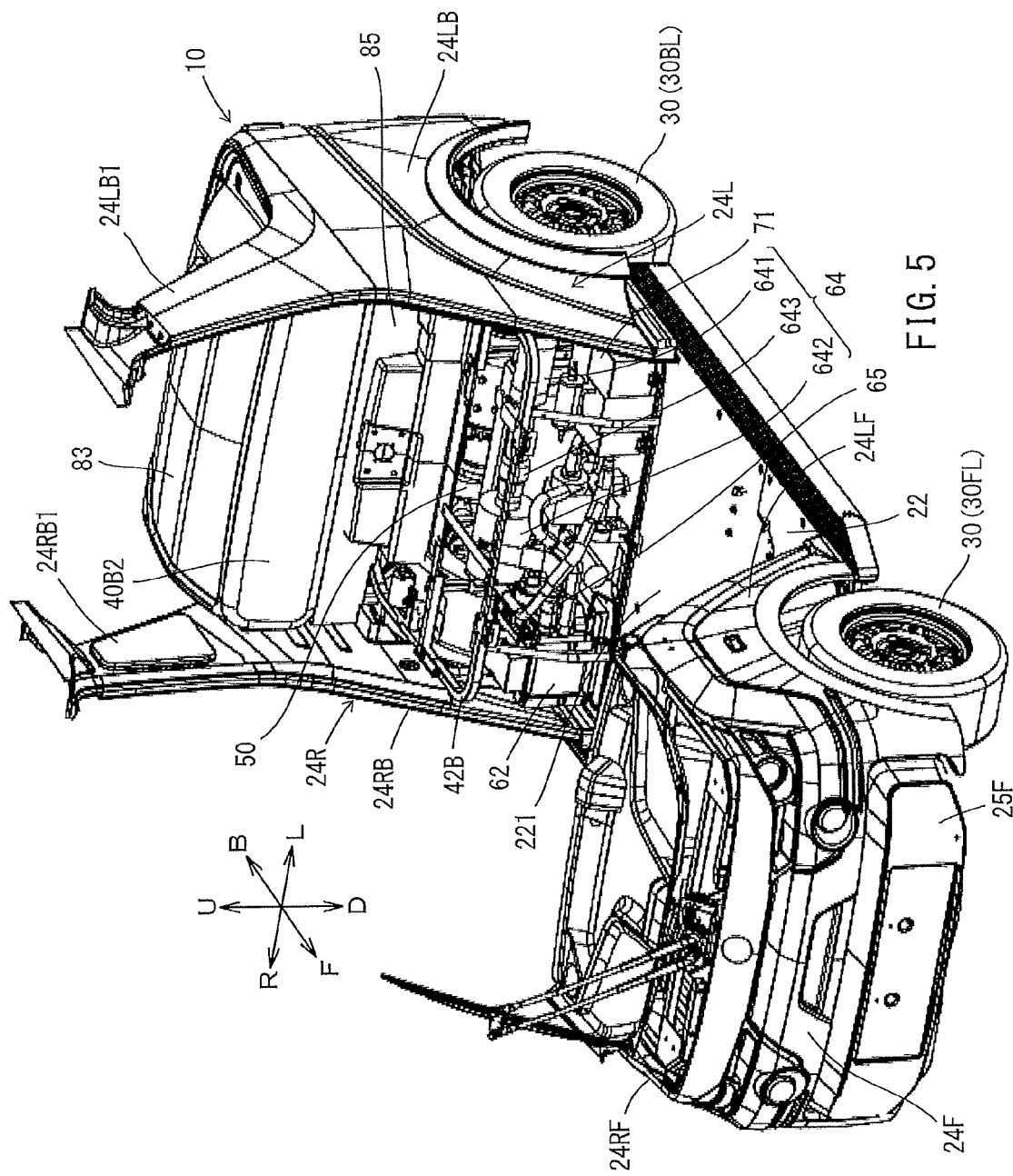
FIG. 5 is a perspective view of an open cabin vehicle according to an embodiment of the present teaching, in which the interior of the open cabin vehicle is made visible in a see-through perspective view.
Figure 6:
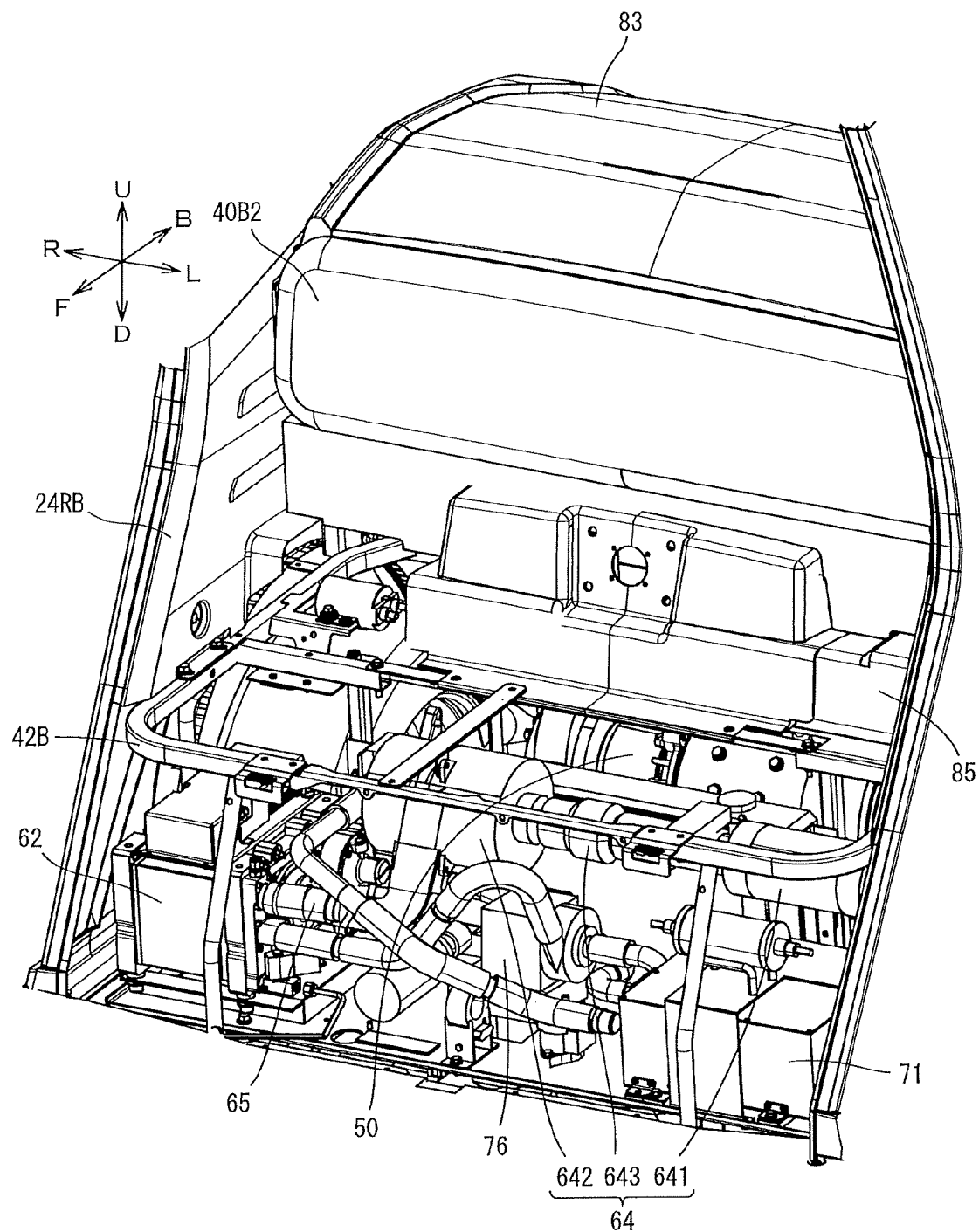
FIG. 6 is an enlarged view to show a part of FIG. 5.
Figure 7:
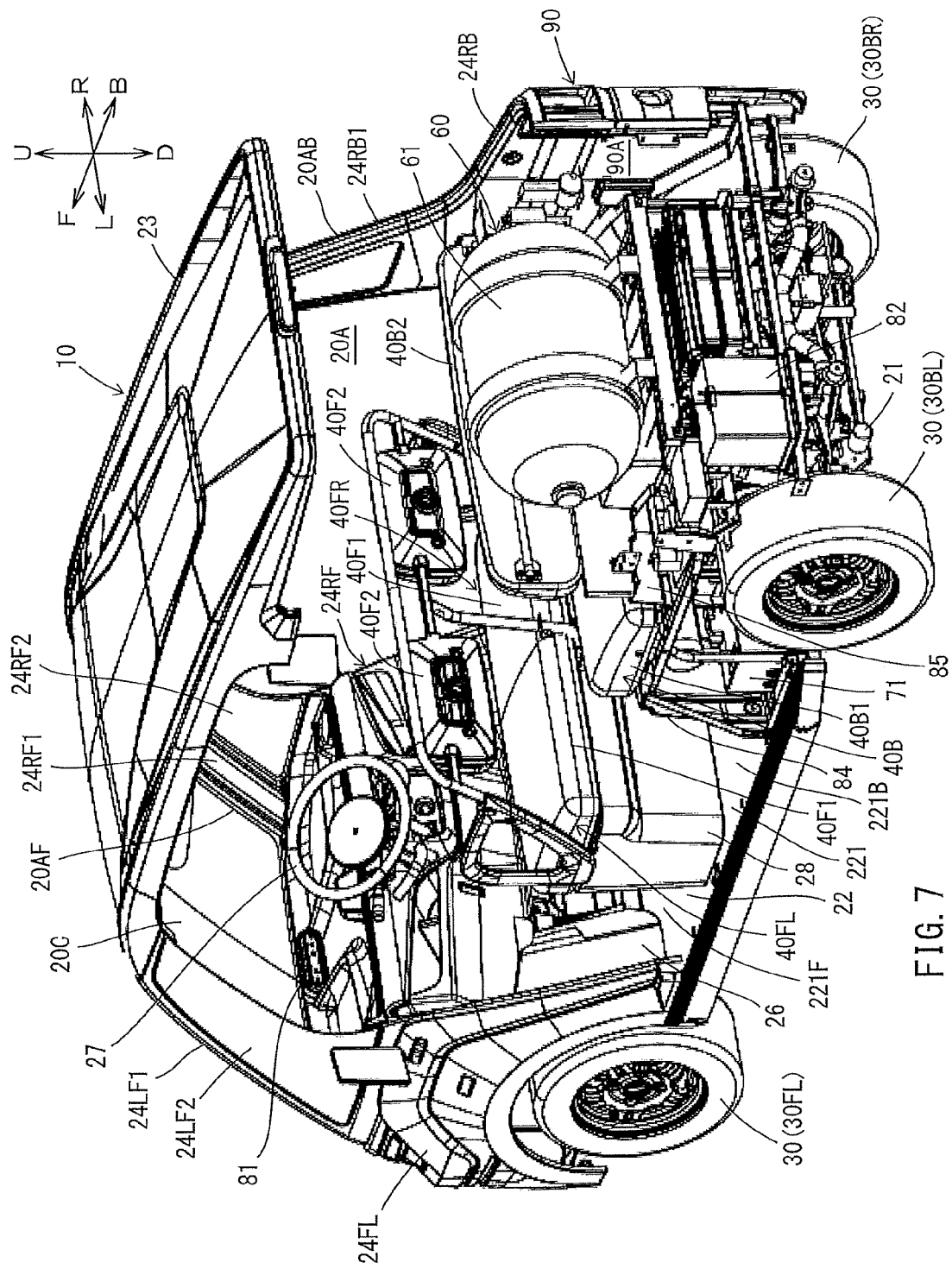
FIG. 7 is a perspective view of an open cabin vehicle according to an embodiment of the present teaching viewed from a direction different from that of FIG. 5, in which the interior of the open cabin vehicle is made visible in a see-through perspective view.
Figure 8:
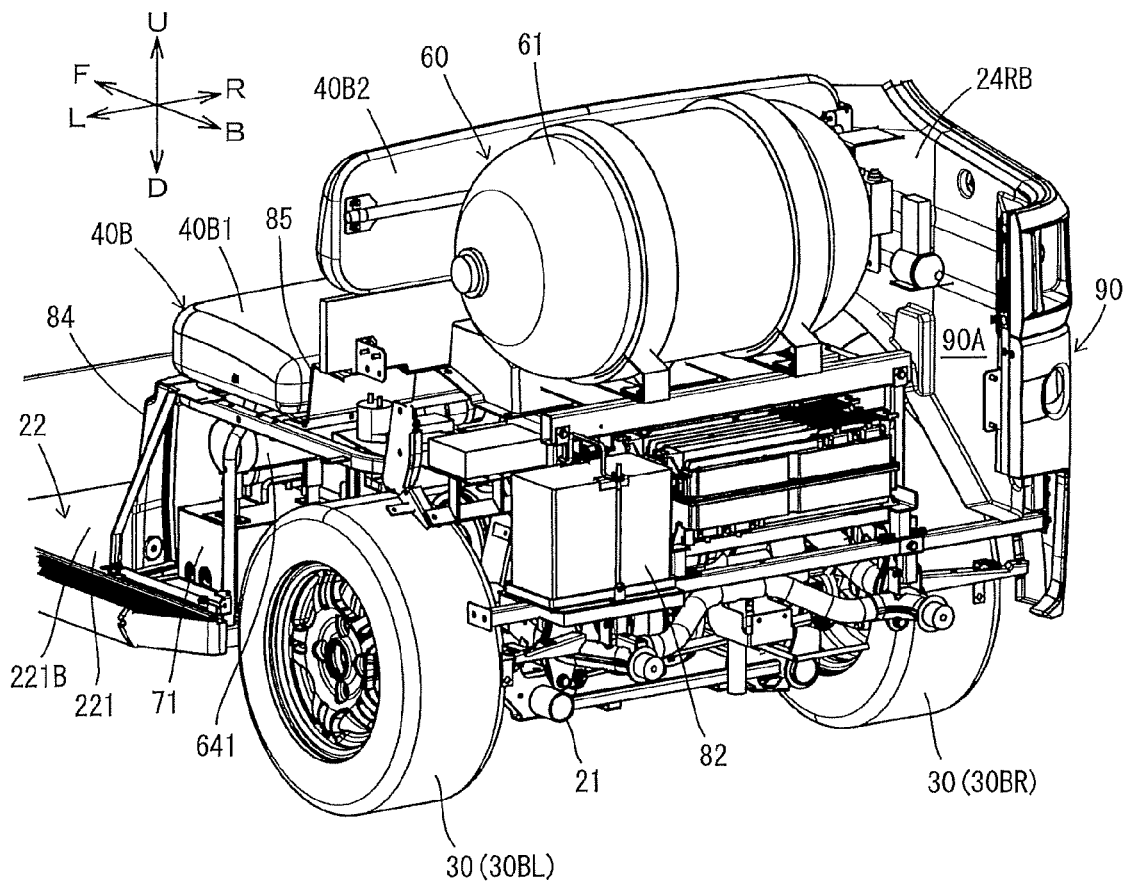
FIG. 8 is an enlarged view to show a part of FIG. 7.
Figure 9:
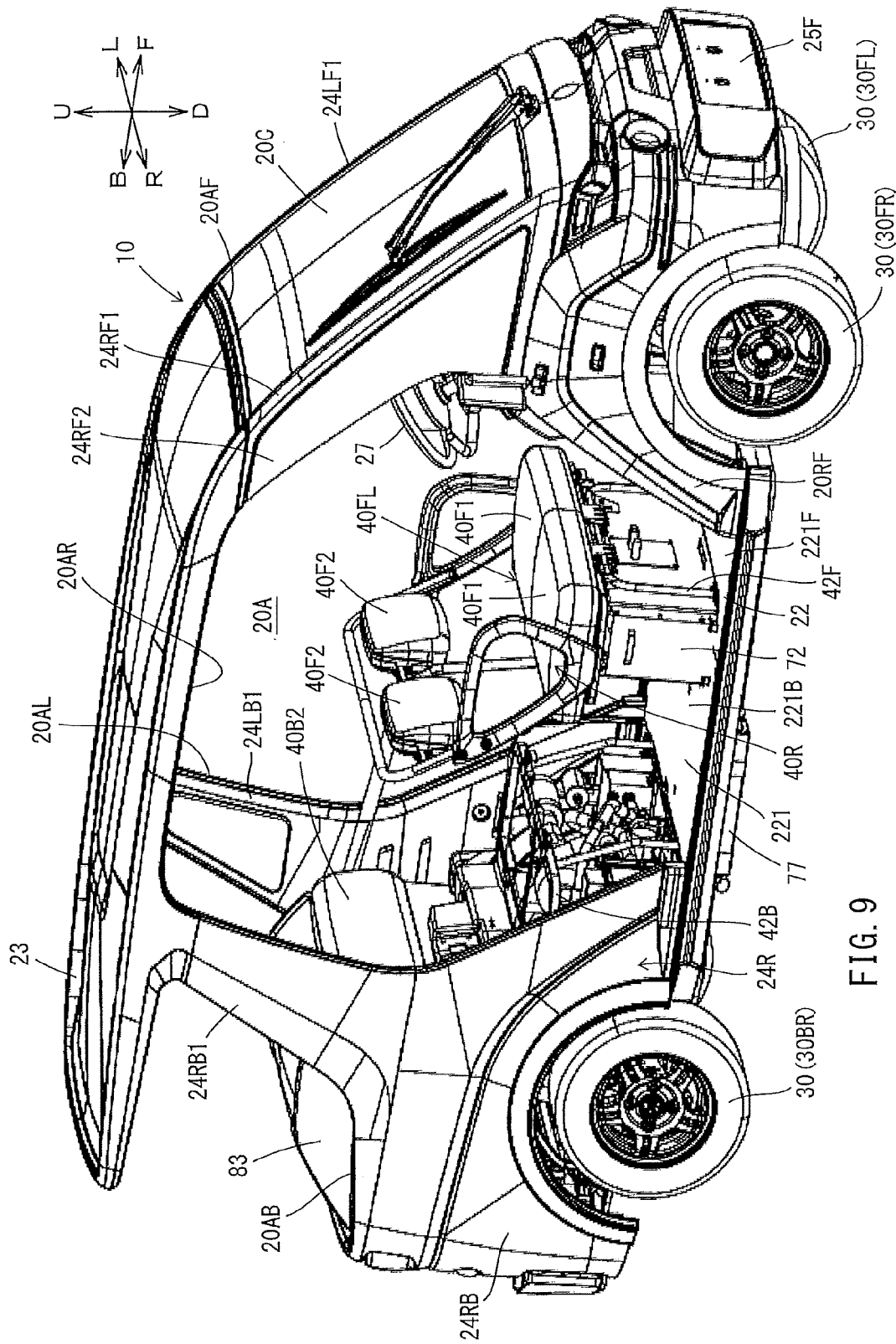
FIG. 9 is a perspective view of an open cabin vehicle according to an embodiment of the present teaching, which is viewed from a direction different from those of FIGS. 5 and 7.

Referring to FIGS. 1 to 9, an open cabin vehicle 10 according to an embodiment of the present teaching will be described. FIG. 1 is a left side view of the open cabin vehicle 10, in which the interior of the open cabin vehicle 10 is made visible in a see-through left side view. FIG. 2 is an enlarged view to show a part of FIG. 1. FIG. 3 is a plan view of the open cabin vehicle 10, in which the interior of the open cabin vehicle 10 is made visible in a see-through plan view. FIG. 4 is an enlarged view to show a part of FIG. 3. FIG. 5 is a perspective view of the open cabin vehicle 10, in which the interior of the open cabin vehicle 10 is made visible in a see-through perspective view. FIG. 6 is an enlarged view to show a part of FIG. 5. FIG. 7 is a perspective view of the open cabin vehicle 10 viewed from a direction different from that of FIG. 5, in which the interior of the open cabin vehicle 10 is made visible in a see-through perspective view. FIG. 8 is an enlarged view to show a part of FIG. 7. FIG. 9 is a perspective view of the open cabin vehicle 10 viewed from a direction different from those of FIGS. 5 and 7.

In the present description, various directions in the open cabin vehicle 10 are defined as follows.

A frontward direction of the open cabin vehicle 10 is defined as a frontward direction "F". A backward direction of the open cabin vehicle 10 is defined as a backward direction "B". A leftward direction of the open cabin vehicle 10 is defined as a leftward direction "L". A rightward direction of the open cabin vehicle 10 is defined as a rightward direction "R". An upward direction of the open cabin vehicle 10 is defined as an upward direction "U". A downward direction of the open cabin vehicle 10 is defined as a downward direction "D". A front-back direction of the open cabin vehicle 10 is defined as a front-back direction "FB". A left-right direction of the open cabin vehicle 10 is defined as a left-right direction "LR". An up-down direction of the open cabin vehicle 10 is defined as an up-down direction "UD". Where, the frontward direction F of the open cabin vehicle 10 is the direction in which the open cabin vehicle travels. The backward direction B, the leftward direction L, the rightward direction R, the upward direction U and the downward direction D of the open cabin vehicle 10 are respectively defined with reference to an occupant who looks in the frontward direction F of the open cabin vehicle 10.

In the present description, an axis or a member which extends in the front-back direction does not necessarily mean only an axis or a member which is parallel with the front-back direction. An axis or a member which extends in the front-back direction includes an axis or a member which is inclined at an angle within ±45° with respect to the front-back direction. Similarly, an axis or a member which extends in the up-down direction includes an axis or a member which is inclined at an angle within ±45° with respect to the up-down direction. An axis or a member which extends in the left-right direction includes an axis or a member which is inclined at angle within ±45° with respect to the left-right direction.

When any two members in the present description are defined as a first member and a second member, the relationship between the any two members has the following meaning. Note that the first member and the second member each mean a member that constitutes the open cabin vehicle 10.

In the present description, the phrase "a first member is disposed farther frontward than a second member" refers to the following state. The first member is disposed in front of a plane which passes through a front end of the second member and is orthogonal to a front-back direction. In this case, the first member and the second member may be aligned or may not be aligned in the front-back direction. This definition will be applied to directions other than the front-back direction.

In the present description, the phrase "a first member is disposed in front of a second member" refers to the following state. At least a part of the first member is disposed in a region over which the second member passes when it is moved in parallel with a frontward direction. Therefore, the first member may fit in the region over which the second member passes when it is moved in parallel with the frontward direction, or protrude from the region over which the second member passes when it is moved in parallel with the frontward direction. In this case, the first member and the second member are aligned in the front-back direction. This definition will be applied to directions other than the front-back direction.

In the present specification, the phrase "the first member is disposed in front of the second member as viewed in the leftward direction or the rightward direction" refers to the following state. At least a part of the first member is disposed, as viewed in the leftward direction or the rightward direction, in a region over which the second member passes when it is moved in parallel with the frontward direction. In this case, the first member and the second member may not be aligned in the front-back direction in a three-dimensional space. This definition will be applied to directions other than the front-back direction.

In the present description, unless otherwise stated, each part of the first member is defined as follows. Note that the first member refers to a member that constitutes the open cabin vehicle 10.

A front part of the first member means a front half of the first member. A rear part of the first member means a back half of the first member. A left part of the first member means a left half of the first member. A right part of the first member means a right half of the first member. An upper part of the first member means an upper half of the first member. A lower part of the first member means a lower half of the first member. A front end of the first member means the end of the first member in the frontward direction. A rear end of the first member means the end of the first member in the backward direction. A left end of the first member means the end of the first member in the leftward direction. A right end of the first member means the end of the first member in the rightward direction. An upper end of the first member means the end of the first member in the upward direction. A lower end of the first member means the end of the first member in the downward direction. A front end part of the first member means the front end and its vicinity of the first member. A rear end part of the first member means the rear end and its vicinity of the first member. A left end part of the first member means the left end and its vicinity of the first member. A right end part of the first member means the right end and its vicinity of the first member. An upper end part of the first member means the upper end and its vicinity of the first member. A lower end part of the first member means the lower end and its vicinity of the first member.

The open cabin vehicle 10 includes a vehicle body 20, a plurality of (four in the present embodiment) wheels 30, a plurality of (three in the present embodiment) seats 40, an electric motor 50, and a fuel cell unit 60. The open cabin vehicle 10 is a vehicle that travels by utilizing electric power generated by the fuel cell unit 60.

The vehicle body 20 forms a vehicle-body inner space 20A which can accommodate an occupant and/or a luggage. The vehicle-body inner space 20A is connected to a vehicle-body outer space 20B which is a space around the vehicle body 20. In other words, the vehicle-body inner space 20A is communicated with the vehicle-body outer space 20B. That is, the vehicle-body inner space 20A is a space opened to the outside.

The vehicle body 20 includes a vehicle body frame 21, a floor 22, a roof 23, a left vehicle-body panel 24L, a right vehicle-body panel 24R, a front vehicle-body panel 24F, a back vehicle-body panel 24B, and a front bumper 25F, a rear bumper 25B, and an inner-front panel 26 (see FIG. 7).

The vehicle body frame 21 supports the floor 22, the left vehicle-body panel 24L, the right vehicle-body panel 24R, the front vehicle-body panel 24F, the back vehicle-body panel 24B, the front bumper 25F, and the rear bumper 25B. The vehicle body frame 21 is formed of, for example, a plurality of pipes and plate-like members.

The floor 22 is supported by the vehicle body frame 21. The floor 22 is formed of, for example, a metal plate. The floor 22 has an upper surface. The upper surface is a floor surface 221 with which an occupant and/or a luggage comes into contact. The floor 22 defines the lower end of the vehicle-body inner space 20A.

The roof 23 is disposed farther upward than the floor 22. The roof 23 is supported by the left vehicle-body panel 24L and the right vehicle-body panel 24R.

The roof 23 defines the upper end of the vehicle-body inner space 20A. That is, the vehicle-body inner space 20A is formed below the roof 23. In other words, the vehicle-body inner space 20A overlaps the roof 23 as viewed in the upward direction or the downward direction of the open cabin vehicle 10.

The front end of the roof 23 is located farther backward than the front vehicle-body panel 24F. The rear end of the roof 23 is located farther frontward than the back vehicle-body panel 24B.

The roof 23 is formed by, for example, a plurality of panels disposed so as to overlap each other in the up-down direction UD. The roof 23 has a lower surface that defines the upper end of the vehicle-body inner space 20A.

The left vehicle-body panel 24L is disposed at the left end part of the vehicle body 20. The left vehicle-body panel 24L includes a left side surface of the vehicle body 20. The left vehicle-body panel 24L is supported by the vehicle body frame 21.

The left vehicle-body panel 24L includes a left-front vehicle-body panel 24LF and a left-back vehicle-body panel 24LB. Each of the left-front vehicle-body panel 24LF and the left-back vehicle-body panel 24LB is formed of, for example, a plurality of panels disposed to overlap each other in the left-right direction LR. Each of the left-front vehicle-body panel 24LF and the left-back vehicle-body panel 24LB defines the left end of the vehicle-body inner space 20A.

The left-front vehicle-body panel 24LF is disposed at the left-front end part of the open cabin vehicle 10. The left-front vehicle-body panel 24LF has a left front pillar 24LF1. The left front pillar 24LF1 is connected to the roof 23. Specifically, the upper end part of the left front pillar 24LF1 is connected to the left-front end part in the roof 23. As a result, the left front pillar 24LF1 supports the roof 23.

Note that in the present embodiment, a left-front transparent panel 24LF2 is provided at the left-front vehicle-body panel 24LF. The left-front transparent panel 24LF2 is disposed along the left front pillar 24LF1. The left-front transparent panel 24LF2 is located behind the left front pillar 24LF1.

The left-back vehicle-body panel 24LB is disposed at the left-rear end part of the open cabin vehicle 10. In other words, the left-back vehicle-body panel 24LB is disposed farther backward than the left-front vehicle-body panel 24LF. In short, the left-back vehicle-body panel 24LB is disposed away from the left-front vehicle-body panel 24LF in the front-back direction FB of the open cabin vehicle 10.

The left-back vehicle-body panel 24LB has a left-back pillar 24LB1. The left-back pillar 24LB1 is connected to the roof 23. Specifically, the upper end part of the left-back pillar 24LB1 is connected to the left-rear part in the roof 23. Thereby, the left-back pillar 24LB1 supports the roof 23.

The right vehicle-body panel 24R is disposed at the right end part of the vehicle body 20. The right vehicle-body panel 24R includes a right side surface of the vehicle body 20. The right vehicle-body panel 24R is supported by the vehicle body frame 21.

The right vehicle-body panel 24R includes a right-front vehicle-body panel 24RF and a right-back vehicle-body panel 24RB. Each of the right-front vehicle-body panel 24RF and the right-back vehicle-body panel 24RB is formed of, for example, a plurality of panels that are disposed to overlap each other in the left-right direction LR. Each of right-front vehicle-body panel 24RF and right-back vehicle-body panel 24RB defines the right end of vehicle-body inner space 20A.

The right-front vehicle-body panel 24RF is disposed at the right-front end part of the open cabin vehicle 10. The right-front vehicle-body panel 24RF has a right-front pillar 24RF1. The right-front pillar 24RF1 is connected to the roof 23. Specifically, the upper end part of the right-front pillar 24RF1 is connected to the right-front end part in the roof 23. As a result, the right-front pillar 24RF1 supports the roof 23.

Note that in the present embodiment, a right-front transparent panel 24RF2 is provided at the right-front vehicle-body panel 24RF. The right-front transparent panel 24RF2 is disposed along the right-front pillar 24RF1. The right-front transparent panel 24RF2 is located behind the right-front pillar 24RF1.

The right-back vehicle-body panel 24RB is disposed at the right-rear end part of the open cabin vehicle 10. In other words, the right-back vehicle-body panel 24RB is disposed farther backward than the right-front vehicle-body panel 24RF. In short, the right-back vehicle-body panel 24RB is disposed away from the right-front vehicle-body panel 24RF in the front-back direction FB of the open cabin vehicle 10.

The right-back vehicle-body panel 24RB has a right-back pillar 24RB1. The right-back pillar 24RB1 is connected to the roof 23. Specifically, the upper end part of the right-back pillar 24RB1 is connected to the right-rear part in the roof 23. Thereby, the right-back pillar 24RB1 supports the roof 23.

The front vehicle-body panel 24F is disposed at the front end part of the vehicle body 20. The front vehicle-body panel 24F includes a front surface of the vehicle body 20. The front vehicle-body panel 24F is supported by the vehicle body frame 21.

The front bumper 25F is disposed at a front end part of the vehicle body 20. The front bumper 25F is disposed below the front vehicle-body panel 24F. The front bumper 25F includes a front end surface of the vehicle body 20. The front bumper 25F is supported by the vehicle body frame 21.

The back vehicle-body panel 24B is disposed at a rear end part of the vehicle body 20. The back vehicle-body panel 24B includes a back surface of the vehicle body 20. The back vehicle-body panel 24B is supported by the vehicle body frame 21. The back vehicle-body panel 24B is formed of, for example, a plurality of panels that are disposed to overlap each other in the front-back direction FB.

The rear bumper 25B is disposed at the rear end part of the vehicle body 20. The rear bumper 25B is disposed below the back vehicle-body panel 24B. The rear bumper 25B includes a rear end surface of the vehicle body 20. The rear bumper 25B is supported by the vehicle body frame 21.

An inner-front panel 26 is provided behind the front vehicle-body panel 24F. The inner-front panel 26 defines the front end of the vehicle-body inner space 20A.

A left entrance 20AL, a right entrance 20AR, a front opening 20AF, and a rear opening 20AB are formed in the vehicle body 20. Hereinafter, these will be described.

The left entrance 20AL is an opening defined by the floor 22, the left-front vehicle-body panel 24LF, the left-back vehicle-body panel 24LB, and the roof 23. In other words, the floor 22 is formed to lead to the left entrance 20AL. There is no door provided at the left entrance 20AL. In other words, the left entrance 20AL is always opened. The vehicle-body inner space 20A is connected to the vehicle-body outer space 20B through the left entrance 20AL.

Note that, in the present embodiment, the left-front transparent panel 24LF2 is provided at the left-front vehicle-body panel 24LF. In other words, a part of the left entrance 20AL is blocked by the left-front transparent panel 24LF2. As a result, in a portion of the left entrance 20AL where the left-front transparent panel 24LF2 is provided, the vehicle-body inner space 20A is not connected to the vehicle-body outer space 20B.

The right entrance 20AR is an opening defined by the floor 22, the right-front vehicle-body panel 24RF, the right-back vehicle-body panel 24RB, and the roof 23. In other words, the floor 22 is formed to lead to the right entrance 20AR. There is no door provided at the right entrance 20AR. In other words, the right entrance 20AR is always opened. The vehicle-body inner space 20A is connected to the vehicle-body outer space 20B through the right entrance 20AR.

Note that, in the present embodiment, a right-front transparent panel 24RF2 is provided at the right-front vehicle-body panel 24RF. In other words, a part of the right entrance 20AR is blocked by the right-front transparent panel 24RF2. As a result, in a portion of the right entrance 20AR where the right-front transparent panel 24RF2 is provided, the vehicle-body inner space 20A is not connected to the vehicle-body outer space 20B.

The front opening 20AF is an opening defined by the front vehicle-body panel 24F, the left-front vehicle-body panel 24LF, the right-front vehicle-body panel 24RF, and the roof 23. A front transparent panel 20C is provided at the front opening 20AF. Thereby, the vehicle-body inner space 20A is not connected to the vehicle-body outer space 20B through the front opening 20AF. The front transparent panel 20C defines the front end of the vehicle-body inner space 20A.

The rear opening 20AB is an opening defined by the back vehicle-body panel 24B, the left-back vehicle-body panel 24LB, the right-back vehicle-body panel 24RB, and the roof 23. There is no back transparent panel provided at the rear opening 20AB. In other words, the rear opening 20AB is always opened. The vehicle-body inner space 20A is connected to the vehicle-body outer space 20B through the rear opening 20AB.

A plurality (four, in the present embodiment) of wheels 30 are each supported by the vehicle body 20. The plurality of wheels 30 include a pair of left and right-front wheels 30FL and 30FR, and a pair of left and right-rear wheels 30BL and 30BR.

The pair of left and right-front wheels 30FL, 30FR are disposed farther frontward than the pair of left and right-rear wheels 30BL, 30BR. The pair of left and right-front wheels 30FL, 30FR are each disposed at the front part of the open cabin vehicle 10. The upper end of each of the pair of left and right-front wheels 30FL, 30FR is located farther upward than the floor 22 as viewed in the leftward direction L or the rightward direction R of the open cabin vehicle 10.

The pair of left and right-front wheels 30FL, 30FR are respectively steered by an occupant operating a steering wheel 27. In other words, the pair of left and right-front wheels 30FL, 30FR are each a steerable wheel.

The pair of left and right-rear wheels 30BL, 30BR are each disposed at the rear part of the open cabin vehicle 10. The upper end of each of the pair of left and right-rear wheels 30BL, 30BR is located farther upward than the floor 22 as viewed in the leftward direction L or the rightward direction R of the open cabin vehicle 10.

The pair of left and right-rear wheels 30BL, 30BR are each rotated by power transferred from an electric motor 50. In other words, the pair of left and right-rear wheels 30BL, 30BR are each a drive wheel.

A plurality (three, in the present embodiment) of seats 40 include two front seats 40FL, 40FR, and one rear seat 40B. Hereinafter, these are described.

The two front seats 40FL, 40FR are each for being seated by an occupant. The two front seats 40FL, 40FR are each disposed farther upward than the floor 22.

The two front seats 40FL, 40FR each include a seating part 40F1 and a backrest part 40F2. The seating part 40F1 includes a seating surface with which the hip of the occupant comes into contact when the occupant is seated. The backrest part 40F2 includes a backrest surface with which at least a part of the back of the occupant comes into contact when the occupant is seated.

Here, the open cabin vehicle 10 further includes a front seat frame 42F. The front seat frame 42F supports the two front seats 40FL, 40FR. The seat frame 42F is formed of, for example, a plurality of pipes and plate members.

The two front seats 40FL, 40FR are disposed so as to be aligned in the left-right direction LR. In the present embodiment, the respective seating parts 40F1 of the two front seats 40FL, 40FR are integrally formed in such a way to be aligned in the left-right direction LR.

Note that in the present embodiment, the occupant as an operator that handles the open cabin vehicle 10 is to be seated in the front seat 40FL of the two front seats 40FL, 40FR. The steering wheel 27 is disposed in front of the front seat 40FL so as to be operable by the occupant as the operator that handles the open cabin vehicle 10.

A battery 72 to be described later is disposed below the two front seats 40FL, 40FR. The battery 72 is surrounded by a battery enclosing panel 28 which defines a space for accommodating the battery 72. The battery enclosing panel 28 is disposed below the two front seats 40FL, 40FR.

In this way, the battery 72 and the battery enclosing panel 28, which will be described below, are disposed below the front seat 40F. For that reason, the floor surface 221 of the floor 22 includes, as viewed in the leftward direction L or the rightward direction R of the open cabin vehicle 10, a front floor surface 221F which is located farther frontward than the battery enclosing panel 28, and a back floor surface 221B which is located farther backward than the battery enclosing panel 28. The front floor surface 221F is a region of the floor surface 221, with which a foot of the occupant who is seated in any of the two front seats 40FL, 40FR is contactable. The back floor surface 221B is a region of the floor surface 221, with which a foot of the occupant who is seated in the rear seat 40B is contactable.

The rear seat 40B is for an occupant to be seated. The rear seat 40B is disposed farther backward than the front seat 40F. The rear seat 40B is disposed farther upward than the floor 22.

The rear seat 40B includes a seating part 40B1 and a backrest part 40B2. The seating part 40B1 includes a seating surface with which the hip of an occupant comes into contact when the occupant is seated in the rear seat 40B. The backrest part 40B2 includes a backrest surface with which a part of the back of an occupant comes into contact when the occupant is seated in the rear seat 40B.

Further, the open cabin vehicle 10 includes a rear seat frame 42B. The rear seat frame 42B is attached to the vehicle body frame 21. The rear seat frame 42B supports the rear seat 40B. The rear seat frame 42B is formed of, for example, a plurality of pipes and plate members.

A fuel-cell-unit arrangement space 90A in which a fuel cell unit 60 is to be disposed is formed in a space located farther backward than the rear seat 40B and a space located farther downward than the rear seat 40B. In the present embodiment, the fuel-cell-unit arrangement space 90A in which a fuel cell unit 60 is to be disposed is formed by utilizing a part of the vehicle-body inner space 20A. Note that details of the fuel-cell-unit arrangement space 90A will be described below.

The electric motor 50 provides driving force to the vehicle body 20. In the present embodiment, the vehicle body 20 is given propelling force by the electric motor 50 rotating each of the pair of left and right-rear wheels 30BL, 30BR. The electric motor 50 is, for example, a three-phase AC motor.

Figure 10:
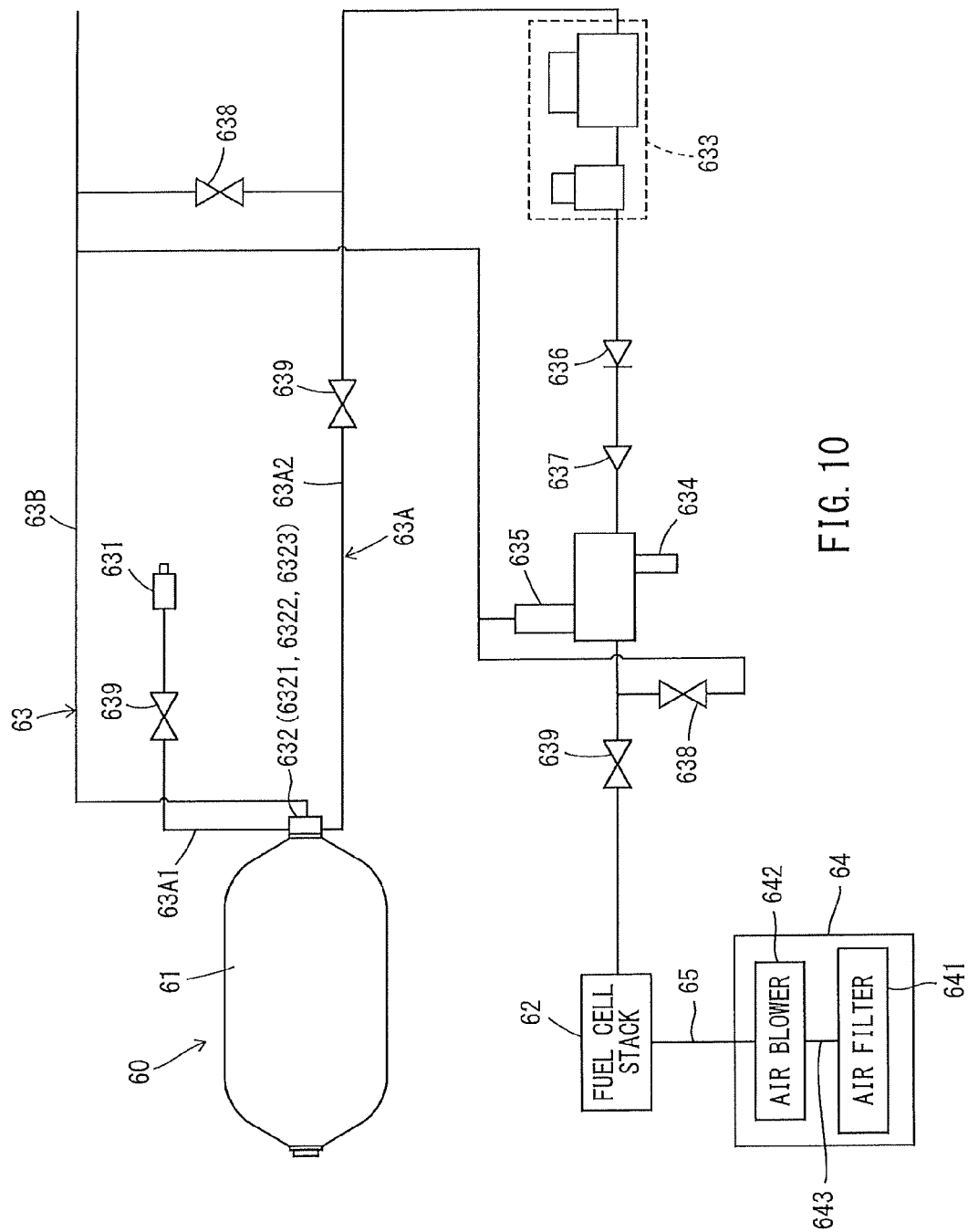
FIG. 10 is a schematic diagram to show a general configuration of a fuel cell unit included in an open cabin vehicle according to an embodiment of the present teaching.

The fuel cell unit 60 generates electric power to be supplied to the electric motor 50. The fuel cell unit 60 will be described with reference to FIG. 10. FIG. 10 is a schematic diagram to illustrate a general configuration of the fuel cell unit 60.

The fuel cell unit 60 includes a hydrogen tank 61, a fuel cell stack 62, hydrogen pipe 63, an oxygen supply apparatus 64, and an oxygen supply pipe 65. Hereinafter, these will be described.

The hydrogen tank 61 stores hydrogen ($H_2$) at a high pressure. Hydrogen stored in the hydrogen tank 61 is supplied to the fuel cell stack 62.

The fuel cell stack 62 generates electric power by chemically reacting hydrogen stored in the hydrogen tank 61 with oxygen ($O_2$) supplied from the oxygen supply apparatus 64. The fuel cell stack 62 includes, for example, a plurality of cells. Each of the plurality of cells includes, for example, a membrane electrode assembly (MEA). The membrane electrode assembly includes, for example, two electrodes (a fuel electrode and an air electrode) and an electrolyte. The two electrodes are each obtained by adhering a catalyst to a supporting current collector. The supporting current collector is formed of, for example, a porous material. The catalyst is formed of platinum, for example. The electrolyte is a polymer film that serves a function of ionic conduction.

The hydrogen pipe 63 is a pipe through which hydrogen flows. The hydrogen pipe 63 includes a hydrogen supply pipe 63A and a hydrogen discharge pipe 63B.

The hydrogen supply pipe 63A includes a first hydrogen supply pipe 63A1 and a second hydrogen supply pipe 63A2. Hereinafter, these will be described.

A hydrogen filling port 631 is provided at an upstream end of the first hydrogen supply pipe 63A1. The hydrogen filling port 631 is connected to a hydrogen supply facility via a hose, etc. In this state, hydrogen is supplied from the hydrogen filling port 631. Note that the hydrogen supply facility is, for example, a filling facility by use of a hydrogen curdle.

A valve unit 632 is provided at a downstream end of the first hydrogen supply pipe 63A1. The valve unit 632 is disposed at an inlet of the hydrogen tank 61. In other words, the first hydrogen supply pipe 63A1 is connected to the hydrogen tank 61 via the valve unit 632.

An upstream end of the second hydrogen supply pipe 63A2 is connected to the valve unit 632. In other words, the second hydrogen supply pipe 63A2 is connected to the hydrogen tank 61 via the valve unit 632.

The valve unit 632 includes an electromagnetic valve 6321. The electromagnetic valve 6321 is opened and closed based on a signal from a controller 80 to be described later. Thereby, switching between a state in which hydrogen is supplied from the hydrogen tank 61 to the fuel cell stack 62 and a state in which hydrogen is not supplied from the hydrogen tank 61 to the fuel cell stack 62 is performed. In other words, the electromagnetic valve 6321 performs switching between a state in which hydrogen flows through the second hydrogen supply pipe 63A and a state in which hydrogen does not flow through the second hydrogen supply pipe 63A based on a signal from the controller 80 to be described later.

A pressure sensor 6322 is provided at the valve unit 632. The pressure sensor 6322 detects pressure inside the hydrogen tank 61, that is, pressure of hydrogen to be stored in the hydrogen tank 61.

A thermistor 6323 is provided in the valve unit 632. The thermistor 6323 detects temperature of the hydrogen tank 61. The thermistor 6323 outputs a detected temperature of the hydrogen tank 61 to the controller 80.

A pressure reducing valve 633 is provided in the second hydrogen supply pipe 63A2. The pressure reducing valve 633 reduces the pressure of hydrogen to be supplied from the hydrogen tank 61 to the fuel cell stack 62. The pressure reducing valve 633 is located farther downstream than the valve unit 632 in a direction in which hydrogen flows in the second hydrogen supply pipe 63A2. In the present embodiment, the pressure reducing valve 633 includes two pressure reducing valves. In other words, the pressure reducing valve 633 reduces, in two steps, the pressure of hydrogen to be supplied from the hydrogen tank 61 to the fuel cell stack 62.

A pressure sensor 634 is provided in the second hydrogen supply pipe 63A2. The pressure sensor 634 detects the pressure of hydrogen flowing through the second hydrogen supply pipe 63A2. The pressure sensor 634 is located farther downstream than the pressure reducing valve 633 in the direction in which hydrogen flows through the second hydrogen supply pipe 63A2. In other words, the pressure sensor 634 detects the pressure of hydrogen which flows through the second hydrogen supply pipe 63A2 and which has been reduced in pressure by the pressure reducing valve 633.

A spring-type safety valve 635 is provided in the second hydrogen supply pipe 63A2. The spring-type safety valve 635 is located farther downstream than the pressure reducing valve 633 in the direction in which hydrogen flows through the second hydrogen supply pipe 63A2. The spring-type safety valve 635 operates when the pressure of hydrogen which flows through the second hydrogen supply pipe 63A2 and which has been reduced in pressure by the pressure reducing valve 633 is larger than a predetermined magnitude. Thereby, hydrogen flows from the second hydrogen supply pipe 63A2 to the hydrogen discharge pipe 63B. In other words, the second hydrogen supply pipe 63A2 is connected to the hydrogen discharge pipe 63B via the spring-type safety valve 635.

A check valve 636 is provided in the second hydrogen supply pipe 63A2. The check valve 636 inhibits hydrogen from flowing in a reverse direction. The check valve 636 is located farther downstream than the pressure reducing valve 633 and farther upstream than the pressure sensor 634 in the direction in which hydrogen flows through the second hydrogen supply pipe 63A2.

A filter 637 is provided in the second hydrogen supply pipe 63A2. The filter 637 removes impurities (for example, dust and dirt) contained in hydrogen which flows through the second hydrogen supply pipe 63A2. The filter 637 is located farther downstream than the check valve 636 and farther upstream than the pressure sensor 634 in a direction in which hydrogen flows through the second hydrogen supply pipe 63A2. In other words, the filter 637 removes impurities contained in hydrogen which has been reduced in pressure by the pressure reducing valve 633.

The fuel cell stack 62 is connected to the downstream end of the second hydrogen supply pipe 63A2. As a result, the hydrogen which flows through the second hydrogen supply pipe 63A2 is supplied to the fuel cell stack 62. In other words, hydrogen stored in the hydrogen tank 61 is supplied to the fuel cell stack 62 via the second hydrogen supply pipe 63A2.

The hydrogen discharge pipe 63B is connected to the hydrogen supply pipe 63A via each of the plurality of valves 638. The hydrogen discharge pipe 63B is for discharging the hydrogen which flows through the hydrogen supply pipe 63A. When hydrogen is supplied from the hydrogen tank 61 to the fuel cell stack 62, each of the plurality of valves 638 is closed.

A plurality of valves 639 are provided in the hydrogen supply pipe 63A. Each of the plurality of valves 639 is closed during maintenance. When hydrogen is supplied from the hydrogen tank 61 to the fuel cell stack 62, each of the plurality of valves 639 is opened.

The oxygen supply apparatus 64 supplies air around the oxygen supply apparatus 64 to the fuel cell stack 62, thereby supplying oxygen contained in the air to the fuel cell stack 62. The oxygen supply apparatus 64 includes an air filter 641, an air blower 642, and a connecting pipe 643.

The air filter 641 removes dust, dirt, and the like contained in the air around the oxygen supply apparatus 64. The air filter 641 is located farther upstream than the air blower 642 in the direction in which air flows in the oxygen supply apparatus 64.

The air blower 642 supplies the air that has passed the air filter 641, to the fuel cell stack 62. The air blower 642 is, for example, a compressor.

The connecting pipe 643 connects the air filter 641 with the air blower 642. The air that has passed the air filter 641 flows in the connecting pipe 643.

The oxygen supply pipe 65 flows the air which is supplied from the oxygen supply apparatus 64. The oxygen supply pipe 65 is connected to the oxygen supply apparatus 64. As a result, oxygen contained in the air around the oxygen supply apparatus 64 is supplied to the fuel cell stack 62.

Figure 11:
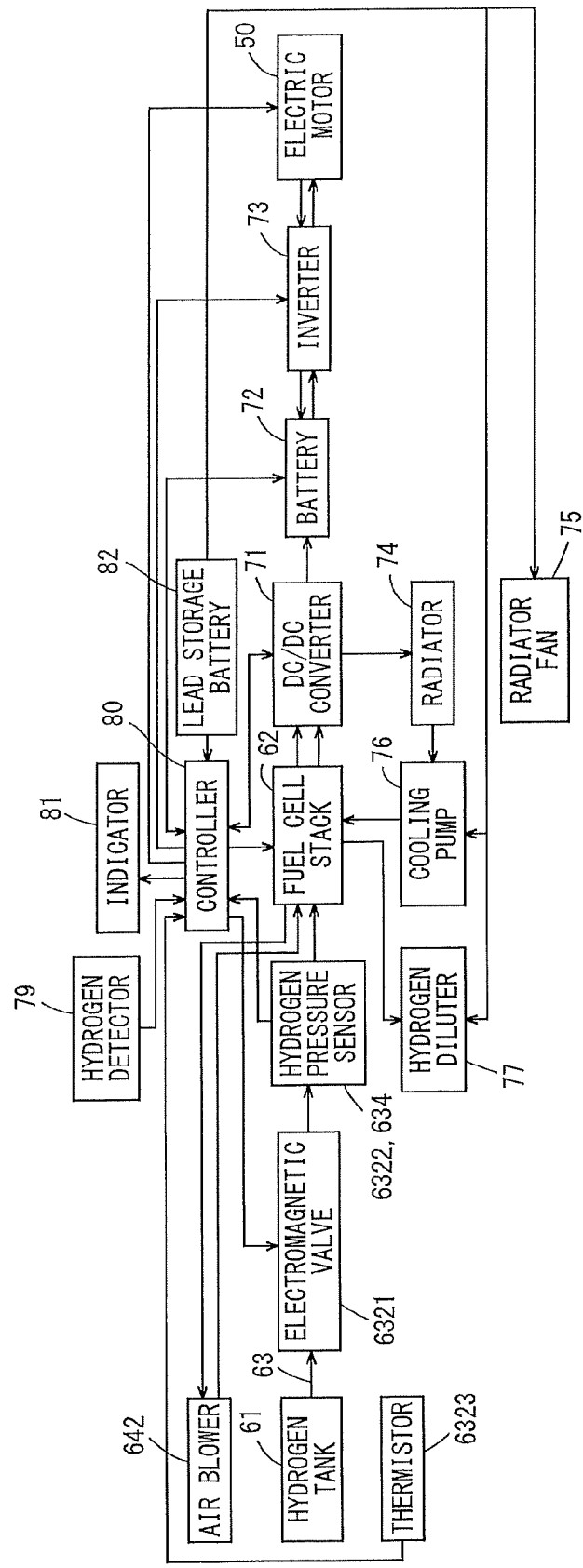
FIG. 11 is a block diagram to show a system for using electric power generated by a fuel cell unit included in an open cabin vehicle according to an embodiment of the present teaching.

Next, a system for utilizing electric power generated by the fuel cell unit 60 will be described with reference to FIG. 11. FIG. 11 is a block diagram to show a system for utilizing electric power generated by the fuel cell unit 60.

The open cabin vehicle 10 further includes a DC/DC converter 71, a battery 72, an inverter 73, a radiator 74, a radiator fan 75, a cooling pump 76, a hydrogen diluter 77, a hydrogen detector 79, a controller 80, an indicator 81, and a lead storage battery 82.

The DC/DC converter 71 increases output voltage of the fuel cell stack 62 and outputs it to the battery 72. In other words, the DC/DC convertor 71 increases the output voltage of the fuel cell stack 62 up to a voltage needed for charging the battery 72.

The battery 72 is a secondary cell which is capable of charging and discharging. The battery 72 has higher volume energy density than the lead storage battery 82. In the present embodiment, the battery 72 is a lithium-ion secondary battery. The battery 72 may be a nickel-cadmium storage battery, a nickel-hydrogen storage battery, or an all-solid-state battery. The battery 72 stores the electric power generated by the fuel cell stack 62. The battery 72 supplies power to the electric motor 50.

The inverter 73 converts DC power outputted from the battery 72 to AC power, and outputs the AC power to the electric motor 50. The electric motor 50 generates driving force that rotates the pair of left and right-rear wheels 30BL and 30BR. In the present embodiment, the electric motor 50 is an AC motor which is driven by AC power outputted from the inverter 73.

The radiator 74 cools cooling water by utilizing the wind generated by the radiator fan 75. The cooling pump 76 pumps out the cooling water cooled by the radiator 74. The cooling water pumped out from the cooling pump 76 passes through the fuel cell stack 62 and the DC/DC converter 71. Thereby, the fuel cell stack 62 and the DC/DC converter 71 are cooled. The cooling water that has passed through the fuel cell stack 62 and the DC/DC converter 71 flows into the radiator 74. In other words, the cooling water to be cooled by the radiator 74 is the cooling water that has passed through the fuel cell stack 62 and the DC/DC converter 71.

The hydrogen diluter 77 dilutes the hydrogen discharged from the fuel cell stack 62 by mixing it with air. The hydrogen diluter 77 is disposed below the floor 22.

The hydrogen detector 79 detects hydrogen concentration. The hydrogen detector 79 outputs the detected hydrogen concentration to the controller 80.

The controller 80 controls operations of the fuel cell stack 62, the electromagnetic valve 6321, the DC/DC converter 71, the battery 72, the inverter 73 and the electric motor 50, based on signals from the hydrogen pressure sensors 634 and 6322, a signal from the thermistor 6323, a signal from the hydrogen detector 79, and the like. The controller 80 is constituted by a combination of a circuit board, an IC, a memory, an electronic component, and the like. The controller 80 is constituted by a plurality of controllers. The plurality of controllers include a controller that controls the fuel cell stack 62, a controller that controls the DC/DC converter 71, and the like. The plurality of controllers may be housed in separate housings or in the same housing.

The indicator 81 notifies the occupant of a remaining amount of hydrogen in the hydrogen tank 61 and a remaining amount of power of the battery 72. The indicator 81 is disposed in the vehicle-body inner space 20A.

The lead storage battery 82 stores electric power. The lead storage battery 82 supplies power to the controller 80, the cooling pump 76, the radiator fan 75, and the hydrogen diluter 77. The lead storage battery 82 serves to drive the controller 80, the cooling pump 76, the radiator fan 75, and the hydrogen diluter 77 before the fuel cell stack 62 is driven.

Figure 12:
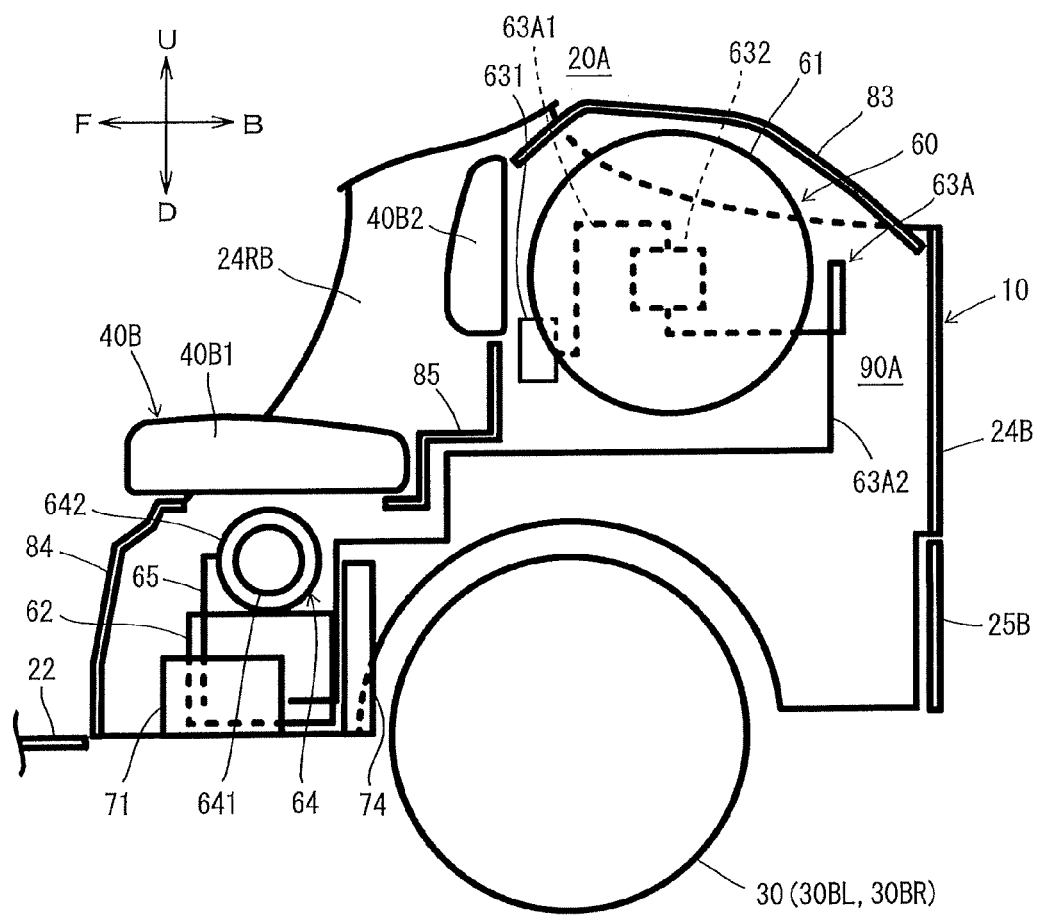
FIG. 12 is a schematic diagram to show arrangement of a fuel cell unit in a fuel-cell-unit arrangement space in an open cabin vehicle according to an embodiment of the present teaching, in which the arrangement of the fuel cell unit in the fuel-cell-unit arrangement space is shown when the open cabin vehicle is viewed in a rightward direction.
Figure 13:
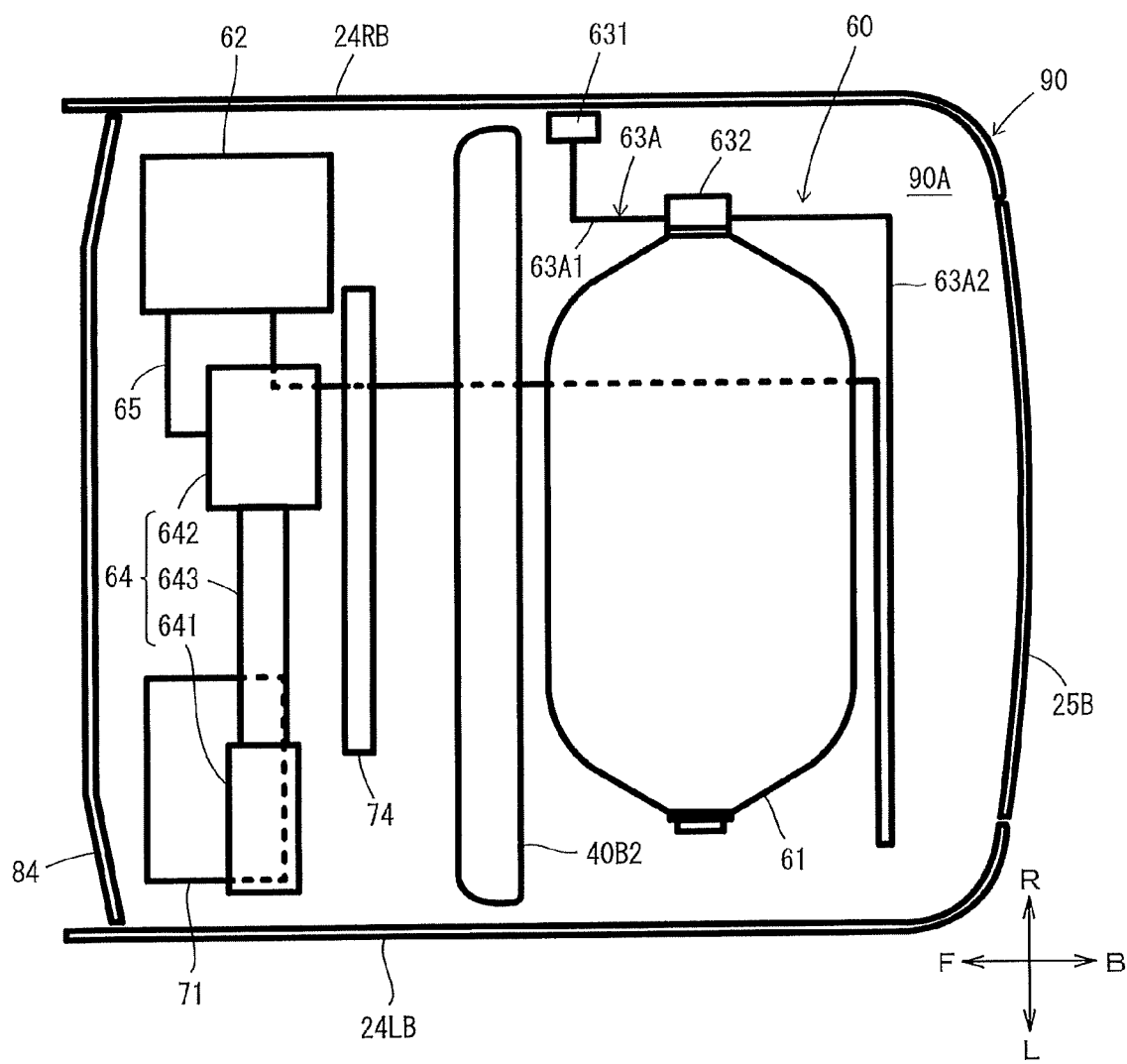
FIG. 13 is a schematic diagram to show arrangement of a fuel cell unit in a fuel-cell-unit arrangement space in an open cabin vehicle according to an embodiment of the present teaching, in which the arrangement of the fuel cell unit in the fuel-cell-unit arrangement space is shown when the open cabin vehicle is viewed in a downward direction.

Next, arrangement of the fuel cell unit 60 will be described with reference to FIGS. 1 to 9, 12, and 13. FIG. 12 is a schematic diagram to show arrangement of the fuel cell unit 60 in the fuel-cell-unit arrangement space 90A when the open cabin vehicle 10 is viewed in the rightward direction R. FIG. 13 is a schematic diagram to show arrangement of the fuel cell unit 60 in the fuel-cell-unit arrangement space 90A when the open cabin vehicle 10 is viewed in the downward direction D.

The fuel cell unit 60 is disposed in the fuel-cell-unit arrangement space 90A to be described later. In other words, the hydrogen tank 61, the fuel cell stack 62, the hydrogen supply pipe 63A, the oxygen supply apparatus 64, and the oxygen supply pipe 65 are disposed in the fuel-cell-unit arrangement space 90A. In short, the hydrogen tank 61, the fuel cell stack 62, the second hydrogen supply pipe 63A2, which connects the hydrogen tank 61 with the fuel cell stack 62, of the hydrogen supply pipe 63A, the oxygen supply apparatus 64, and the oxygen supply pipe 65 are disposed in the fuel-cell-unit arrangement space 90A.

The open cabin vehicle 10 further includes a back-seat lower panel 84 and a back-seat intermediate panel 85. The back-seat lower panel 84 and the back-seat intermediate panel 85 each contribute to the formation of the fuel-cell-unit arrangement space 90A as will be described later.

The back-seat lower panel 84 is disposed farther downward than the seating part 40B1 of the rear seat 40B. The back-seat lower panel 84 extends in the up-down direction UD. The back-seat lower panel 84 has an upper end part extending in the front-back direction FB. The back-seat lower panel 84 has its upper end part attached to the rear seat frame 42 which supports the seating part 40B1. The back-seat lower panel 84 has an upper end part located below the seating part 40B1.

The back-seat intermediate panel 85 is disposed between the seating part 40B1 and the backrest part 40B2 of the rear seat 40B. The back-seat intermediate panel 85 has its lower end part extending in the front-back direction FB. The back-seat intermediate panel 85 has an upper end part extending in the up-down direction UD. The back-seat intermediate panel 85 has a lower end part located below the seating part 40B1 of the rear seat 40B. The back-seat intermediate panel 85 has its upper end part located below the backrest part 40B2 of the rear seat 40B. The backrest part 40B2 of the rear seat 40B is supported by the left-back vehicle-body panel 24LB and the right-back vehicle-body panel 24RB.

The fuel-cell-unit arrangement space 90A in which the fuel cell unit 60 is disposed is formed of the left-back vehicle-body panel 24LB, the right-back vehicle-body panel 24RB, the back vehicle-body panel 24B, the back-seat lower panel 84, the seating part 40B1 of the rear seat 40B, the back-seat intermediate panel 85, and the backrest part 40B2 of the rear seat 40B. In other words, a fuel-cell-unit-arrangement-space forming wall part 90 is implemented by the left-back vehicle-body panel 24LB, the right-back vehicle-body panel 24RB, the back vehicle-body panel 24B, the back-seat lower panel 84, the seating part 40B1 of the rear seat 40B, the back-seat intermediate panel 85, and the backrest part 40B2 of the rear seat 40B.

The fuel-cell-unit arrangement space 90A which is formed of a fuel-cell-unit-arrangement-space forming wall part 90 is provided below a space being present farther backward than the floor 22, of the vehicle-body inner space 20A. Moreover, the fuel-cell-unit arrangement space 90A is formed farther backward than a back floor surface 211B, with which a foot of the occupant seating in the rear seat 40B is contactable, of the floor 22. The fuel-cell-unit arrangement space 90A is connected to the vehicle-body inner space 20A in the up-down direction UD of the open cabin vehicle 10. As a result, the fuel-cell-unit arrangement space 90A is connected to the vehicle-body outer space 20B, which is a space around the open cabin vehicle 10, via the vehicle-body inner space 20A.

To form the fuel-cell-unit arrangement space 90A, the fuel-cell-unit-arrangement-space forming wall part 90 is disposed so as to surround the fuel cell unit 60 which is disposed in the fuel-cell-unit arrangement space 90A, as viewed in the upward direction or the downward direction of the open cabin vehicle 10. Specifically, as follows:

The left-back vehicle-body panel 24LB is disposed farther leftward than the fuel cell unit 60 as viewed in the upward direction U or the downward direction D of the open cabin vehicle 10. In other words, the left-back vehicle-body panel 24LB is disposed farther leftward than the hydrogen tank 61, the fuel cell stack 62, the hydrogen supply pipe 63A, the oxygen supply apparatus 64, and the oxygen supply pipe 65 as viewed in the upward direction U or the downward direction D of the open cabin vehicle 10. In the present embodiment, the left-back vehicle-body panel 24LB is disposed to the left of the hydrogen tank 61, the fuel cell stack 62, the hydrogen supply pipe 63A, the oxygen supply apparatus 64, and the oxygen supply pipe 65 as viewed in the upward direction U or the downward direction D of the open cabin vehicle 10.

As viewed in the upward direction U or the downward direction D of the open cabin vehicle 10, the distance from the fuel cell stack 62 to the left-back vehicle-body panel 24LB is longer than the distance from the hydrogen tank 61 to the left-back vehicle-body panel 24LB. As viewed in the upward direction U or the downward direction D of the open cabin vehicle 10, the distance from the hydrogen supply pipe 63A to the left-back vehicle-body panel 24LB is shorter than the distance from the hydrogen tank 61 to the left-back vehicle-body panel 24LB. As viewed in the upward direction U or the downward direction D of the open cabin vehicle 10, the distance from the oxygen supply apparatus 64 to the left-back vehicle-body panel 24LB is shorter than the distance from the hydrogen tank 61 to the left-back vehicle-body panel 24LB. As viewed in the upward direction U or the downward direction D of the open cabin vehicle 10, the distance from the oxygen supply pipe 65 to the left-back vehicle-body panel 24LB is longer than the distance from the hydrogen tank 61 to the left-back vehicle-body panel 24LB.

The right-back vehicle-body panel 24RB is disposed farther rightward than the fuel cell unit 60 as viewed in the upward direction U or the downward direction D of the open cabin vehicle 10. In other words, the right-back vehicle-body panel 24RB is disposed farther rightward than the hydrogen tank 61, the fuel cell stack 62, the hydrogen supply pipe 63A, the oxygen supply apparatus 64, and the oxygen supply pipe 65 as viewed in the upward direction U or the downward direction D of the open cabin vehicle 10. In the present embodiment, the right-back vehicle-body panel 24RB is disposed to the right of the hydrogen tank 61, the fuel cell stack 62, the hydrogen supply pipe 63A, the oxygen supply apparatus 64, and the oxygen supply pipe 65 as viewed in the upward direction U or the downward direction D of the open cabin vehicle 10.

As viewed in the upward direction U or the downward direction D of the open cabin vehicle 10, the distance from the fuel cell stack 62 to the right-back vehicle-body panel 24RB is shorter than the distance from the hydrogen tank 61 to the right-back vehicle-body panel 24RB. As viewed in the upward direction U or the downward direction D of the open cabin vehicle 10, the distance from the hydrogen supply pipe 63A to the right-back vehicle-body panel 24RB is shorter than the distance from the hydrogen tank 61 to the right-back vehicle-body panel 24RB. As viewed in the upward direction U or the downward direction D of the open cabin vehicle 10, the distance from the oxygen supply apparatus 64 to the right-back vehicle-body panel 24RB is longer than the distance from the hydrogen tank 61 to the right-back vehicle-body panel 24RB. As viewed in the upward direction U or the downward direction D of the open cabin vehicle 10, the distance from the oxygen supply pipe 65 to the right-back vehicle-body panel 24RB is longer than the distance from the hydrogen tank 61 to the right-back vehicle-body panel 24RB.

As viewed in the upward direction U or the downward direction D of the open cabin vehicle 10, the back-seat lower panel 84 is disposed farther frontward than the fuel cell unit 60. In other words, the back-seat lower panel 84 is disposed farther frontward than the hydrogen tank 61, the fuel cell stack 62, the hydrogen supply pipe 63A, the oxygen supply apparatus 64, and the oxygen supply pipe 65, as viewed in the upward direction U or the downward direction D of the open cabin vehicle 10. In the present embodiment, the back-seat lower panel 84 is disposed in front of the hydrogen tank 61, the fuel cell stack 62, the hydrogen supply pipe 63A, the oxygen supply apparatus 64, and the oxygen supply pipe 65, as viewed in the upward direction U or the downward direction D of the open cabin vehicle 10.

As viewed in the upward direction U or the downward direction D of the open cabin vehicle 10, the distance from the fuel cell stack 62 to the back-seat lower panel 84 is shorter than the distance from the hydrogen tank 61 to the back-seat lower panel 84. As viewed in the upward direction U or the downward direction D of the open cabin vehicle 10, the distance from the hydrogen supply pipe 63A to the back-seat lower panel 84 is shorter than the distance from the hydrogen tank 61 to the back-seat lower panel 84. As viewed in the upward direction U or the downward direction D of the open cabin vehicle 10, the distance from the oxygen supply apparatus 64 to the back-seat lower panel 84 is shorter than the distance from the hydrogen tank 61 to the back-seat lower panel 84. As viewed in the upward direction U or the downward direction D of the open cabin vehicle 10, the distance from the oxygen supply pipe 65 to the back-seat lower panel 84 is shorter than the distance from the hydrogen tank 61 to the back-seat lower panel 84.

As viewed in the leftward direction L or the rightward direction R of the open cabin vehicle 10, the seating part 40B1 of the rear seat 40B is disposed farther frontward than the hydrogen tank 61 and a part of the hydrogen supply pipe 63A of the fuel cell unit 60. In the present embodiment, the seating part 40B1 of the rear seat 40B is disposed in front of the hydrogen tank 61 and a part of the hydrogen supply pipe 63A of the fuel cell unit 60 as viewed in the leftward direction L or the rightward direction R of the open cabin vehicle 10.

As viewed in the leftward direction L or the rightward direction R of the open cabin vehicle 10, the seating part 40B1 of the rear seat 40B is disposed farther upward than the fuel cell stack 62, a downstream end part of the hydrogen supply pipe 63A, that is, an end part connected to the fuel cell stack 62 in the second hydrogen supply pipe 63A2, the oxygen supply apparatus 64 and the oxygen supply pipe 65. In the present embodiment, the seating part 40B1 of the rear seat 40B is disposed above the fuel cell stack 62, a downstream end part of the hydrogen supply pipe 63A, that is, an end part connected to the fuel cell stack 62 in the hydrogen supply pipe 63A, the oxygen supply apparatus 64 and the oxygen supply pipe 65 as viewed in the leftward direction L or the rightward direction R of the open cabin vehicle 10.

As viewed in the leftward direction L or the rightward direction R of the open cabin vehicle 10, the distance from the fuel cell stack 62 to the seating part 40B1 of the rear seat 40B is longer than the distance from the oxygen supply apparatus 64 to the seating part 40B1 of the rear seat 40B. As viewed in the leftward direction L or the rightward direction R of the open cabin vehicle 10, the distance from the fuel cell stack 62 to the seating part 40B1 of the rear seat 40B is longer than the distance from the oxygen supply pipe 65 to the seating part 40B1 of the rear seat 40B. As viewed in the leftward direction L or the rightward direction R of the open cabin vehicle 10, the distance from the fuel cell stack 62 to the seating part 40B1 of the rear seat 40B is shorter than the distance from a downstream end part of the hydrogen supply pipe 63A, that is, an end part which is connected to the fuel cell stack 62 in the second hydrogen supply pipe 63A2.

The seating part 40B1 of the rear seat 40B is disposed farther downward than the upper end of the hydrogen tank 61 as viewed in the leftward direction L or the rightward direction R of the open cabin vehicle 10. In other words, the upper end of the hydrogen tank 61 is located farther upward than the seating part 40B1 of the rear seat 40B as viewed in the leftward direction L or the rightward direction R of the open cabin vehicle 10.

The back-seat intermediate panel 85 is disposed farther frontward than the hydrogen tank 61 and a part of the hydrogen supply pipe 63A of the fuel cell unit 60 as viewed in the leftward direction L or the rightward direction R of the open cabin vehicle 10. In the present embodiment, the back-seat intermediate panel 85 is disposed in front of the hydrogen tank 61 and a part of the hydrogen supply pipe 63A of the fuel cell unit 60 as viewed in the leftward direction L or the rightward direction R of the open cabin vehicle 10.

The back-seat intermediate panel 85 is disposed farther upward than the fuel cell stack 62, a downstream end part of the hydrogen supply pipe 63A, that is, an end part connected to the fuel cell stack 62 in the hydrogen supply pipe 63A, the oxygen supply apparatus 64, and the oxygen supply pipe 65 as viewed in the leftward direction L or the rightward direction R of the open cabin vehicle 10. In the present embodiment, the back-seat intermediate panel 85 is disposed farther backward than the fuel cell stack 62, a downstream end part of the hydrogen supply pipe 63A, that is, an end part connected to the fuel cell stack 62 in the hydrogen supply pipe 63A, the oxygen supply apparatus 64 and the oxygen supply pipe 65 as viewed in the leftward direction L or the rightward direction R of the open cabin vehicle 10.

The backrest part 40B2 of the rear seat 40B is disposed farther frontward than the hydrogen tank 61 and a part of the hydrogen supply pipe 63A of the fuel cell unit 60 as viewed in the leftward direction L or the rightward direction R of the open cabin vehicle 10. In other words, the hydrogen tank 61 is disposed farther backward than the rear seat 40B. In the present embodiment, the backrest part 40B2 of the rear seat 40B is disposed in front of the hydrogen tank 61 and a part of the hydrogen supply pipe 63A of the fuel cell unit 60 as viewed in the leftward direction L or the rightward direction R of the open cabin vehicle 10.

The backrest part 40B2 of the rear seat 40B is disposed farther upward than the fuel cell stack 62, a downstream end part of the hydrogen supply pipe 63A, that is, an end part connected to the fuel cell stack 62 in the hydrogen supply pipe 63A, the oxygen supply apparatus 64 and the oxygen supply pipe 65 as viewed in the leftward direction L or the rightward direction R of the open cabin vehicle 10. The backrest part 40B2 of the rear seat 40B is disposed farther backward than the fuel cell stack 62, a downstream end part of the hydrogen supply pipe 63A, that is, an end part connected to the fuel cell stack 62 in the hydrogen supply pipe 63A, the oxygen supply apparatus 64 and the oxygen supply pipe 65 as viewed in the leftward direction L or the rightward direction R of the open cabin vehicle 10.

The back vehicle-body panel 24B is disposed farther backward than the fuel cell unit 60 as viewed in the leftward direction L or the rightward direction R of the open cabin vehicle 10. In other words, the back vehicle-body panel 24B is disposed farther backward than the hydrogen tank 61, the fuel cell stack 62, the hydrogen supply pipe 63A, the oxygen supply apparatus 64, and the oxygen supply pipe 65, as viewed in the leftward direction L or the rightward direction R of the open cabin vehicle 10. In the present embodiment, the back vehicle-body panel 24B is disposed behind the hydrogen tank 61, the fuel cell stack 62, the hydrogen supply pipe 63A, the oxygen supply apparatus 64, and the oxygen supply pipe 65, as viewed in the leftward direction L or the rightward direction R of the open cabin vehicle 10.

As viewed in the leftward direction L or the rightward direction R of the open cabin vehicle 10, the distance from the hydrogen tank 61 to the backrest part 40B2 of the rear seat 40B is shorter than the distance from the hydrogen tank 61 to the back vehicle-body panel 24B.

The fuel cell stack 62 is supported by a support plate via a mounting rubber in a state in which the fuel cell unit 60 is disposed in the fuel-cell-unit arrangement space 90A. The support plate is supported by the vehicle body frame 21. The support plate is formed of a member different from the floor 22. The support plate is disposed farther backward than the floor 22. The fuel cell stack 62 is supported by the mount rubber, and thereby disposed farther upward than the floor 22.

The hydrogen tank 61 is supported by the vehicle body 20 via a hydrogen-tank support frame in a state in which the fuel cell unit 60 is disposed in the fuel-cell-unit arrangement space 90A. The hydrogen-tank support frame is supported by the vehicle body frame 21.

The hydrogen supply pipe 63A is supported by the vehicle body 20 via, for example, at least one bracket in a state in which the fuel cell unit 60 is disposed in the fuel-cell-unit arrangement space 90A. The bracket is supported by, for example, the vehicle body frame 21.

The upper end of each of the hydrogen tank 61, the fuel cell stack 62, the hydrogen supply pipe 63A, the oxygen supply apparatus 64, and the oxygen supply pipe 65 is located farther upward than the floor 22 in a state in which the fuel cell unit 60 is disposed in the fuel-cell-unit arrangement space 90A.

At least one of the hydrogen tank 61, the fuel cell stack 62, the hydrogen supply pipe 63A, the oxygen supply apparatus 64, and the oxygen supply pipe 65 has its lower end located farther upward than the floor 22 in a state in which the fuel cell unit 60 is disposed in the fuel-cell-unit arrangement space 90A. In the present embodiment, the lower end of each of the hydrogen tank 61, the fuel cell stack 62, the hydrogen supply pipe 63A, the oxygen supply apparatus 64, and the oxygen supply pipe 65 is located farther upward than the floor 22 in a state in which the fuel cell unit 60 is disposed in the fuel-cell-unit arrangement space 90A. For that reason, the floor 22 can be disposed closer to the ground.

The fuel cell stack 62, a part of the hydrogen supply pipe 63A, the oxygen supply apparatus 64, and the oxygen supply pipe 65 are disposed below the rear seat 40B in a state in which the fuel cell unit 60 is disposed in the fuel-cell-unit arrangement space 90A. That is, at least one of the hydrogen tank 61, the fuel cell stack 62, and the hydrogen supply pipe 63A is disposed below the rear seat 40B. In other words, at least one of the fuel cell stack 62 and a part of the hydrogen supply pipe 63A is disposed below the rear seat 40B. As a result, it is possible to efficiently utilize a dead space below the rear seat 40B.

The hydrogen tank 61 is disposed farther upward than each of the pair of the left and right-rear wheels 30BL, 30BR as viewed in the leftward direction L or the rightward direction R of the open cabin vehicle 10 in a state in which the fuel cell unit 60 is disposed in the fuel-cell-unit arrangement space 90A. In other words, the upper end of the hydrogen tank 61 is located farther upward than the pair of the left and right-rear wheels 30BL, 30BR as viewed in the leftward direction L or the rightward direction R of the open cabin vehicle 10. The lower end of the hydrogen tank 61 is located farther upward than the pair of the left and right-rear wheels 30BL, 30BR as viewed in the leftward direction L or the rightward direction R of the open cabin vehicle 10. For that reason, it is easy to form a space blow the hydrogen tank 61. As a result, the electric motor 50 can be disposed below the hydrogen tank 61.

In the present embodiment, the hydrogen tank 61 is located above the pair of the left and right-rear wheels 30BL, 30BR as viewed in the leftward direction L or the rightward direction R of the open cabin vehicle 10. As viewed in the leftward direction L or the rightward direction R of the open cabin vehicle 10, the front end of the hydrogen tank 61 is located farther frontward than the rear ends of the pair of the left and right-rear wheels 30BL, 30BR, and is located farther backward than the front ends of the pair of the left and right-rear wheels 30BL, 30BR. For that reason, the hydrogen tank 61 can be disposed close to the pair of the left and right-rear wheels 30BL, 30BR in the front-back direction FB of the open cabin vehicle 10.

Here, the open cabin vehicle 10 further includes a cover 83. The cover 83 is disposed above the hydrogen tank 61. The cover 83 defines the upper end of the fuel-cell-unit arrangement space 90A. The cover 83 is disposed so as to have a gap between itself and each of the left-back vehicle-body panel 24LB, the right-back vehicle-body panel 24RB, the back vehicle-body panel 24B, and the backrest part 40B2 of the rear seat 40B. Accordingly, the cover 83 allows the fuel-cell-unit arrangement space 90A and the vehicle-body inner space 20A to be connected. Therefore, in case of accidental hydrogen leakage, the leaked hydrogen becomes more likely to be diffused into the vehicle-body outer space 20B via the vehicle-body inner space 20A after being discharged from the fuel-cell-unit arrangement space 90A.

In such an open cabin vehicle 10, the hydrogen tank 61, the fuel cell stack 62, and the hydrogen supply pipe 63A connecting those can be disposed by taking advantage of an originally simple structure of the open cabin vehicle 10. Therefore, even when equipped with the fuel cell unit 60 having the hydrogen tank 61, it is possible to simplify the structure of the open cabin vehicle 10.

Variation 1 of Embodiment

Figure 14:
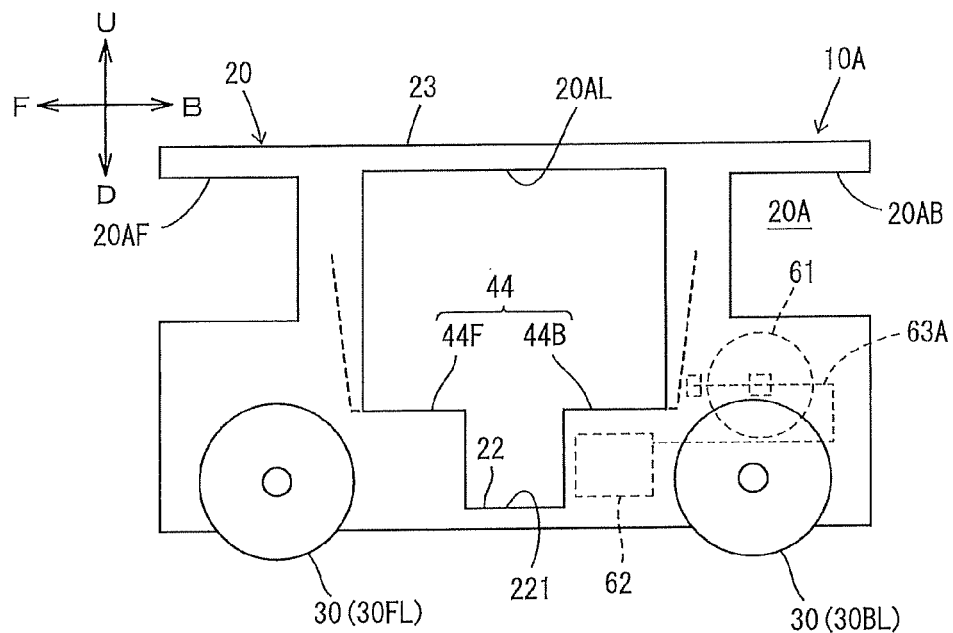
FIG. 14 is a left side view to show an open cabin vehicle according to Variation 1 of an embodiment of the present teaching.

An open cabin vehicle 10A according to variation 1 of an embodiment of the present teaching will be described with reference to FIG. 14. FIG. 14 is a left side view to show the open cabin vehicle 10A. Note that in the description below, it is supposed that a direction from right to left in FIG. 14 is the frontward direction F of the open cabin vehicle 10A.

The open cabin vehicle 10A is different from the open cabin vehicle 10 in that the open cabin vehicle 10A is an autonomous vehicle that can travel without being operated by an occupant. The open cabin vehicle 10A is different from the open cabin vehicle 10 in that it is capable of switching back. The open cabin vehicle 10A is different from the open cabin vehicle 10 in that a communication seat 44 is provided. The open cabin vehicle 10A is different from the open cabin vehicle 10 in that no transparent panel is provided in each of the front opening 20AF and the rear opening 20AB.

The communication seat 44 has a structure in which a plurality of seats are disposed such that a plurality of occupants can talk face to face with each other. The communication seat 44 includes a front seat 44F and a rear seat 44B. An occupant sitting in the front seat 44F can talk face to face with an occupant sitting in the rear seat 44B. An occupant sitting on the rear seat 44B can talk face to face with an occupant sitting on the front seat 44F.

In the open cabin vehicle 10A, the fuel cell stack 62 and a part of the hydrogen supply pipe 63A are disposed farther downward than the rear seat 44B. The hydrogen tank 61 and a part of the hydrogen supply pipe 63A are disposed farther backward than the rear seat 44B.

Even in such open cabin vehicle 10A, the hydrogen tank 61, the fuel cell stack 62, and the hydrogen supply pipe 63A for connecting those can be disposed by taking advantage of an originally simple structure of the open cabin vehicle 10A. Therefore, even when equipped with the fuel cell unit 60 having the hydrogen tank 61, it is possible to simplify the structure of the open cabin vehicle 10A.

Variation 2 of Embodiment

Figure 15:
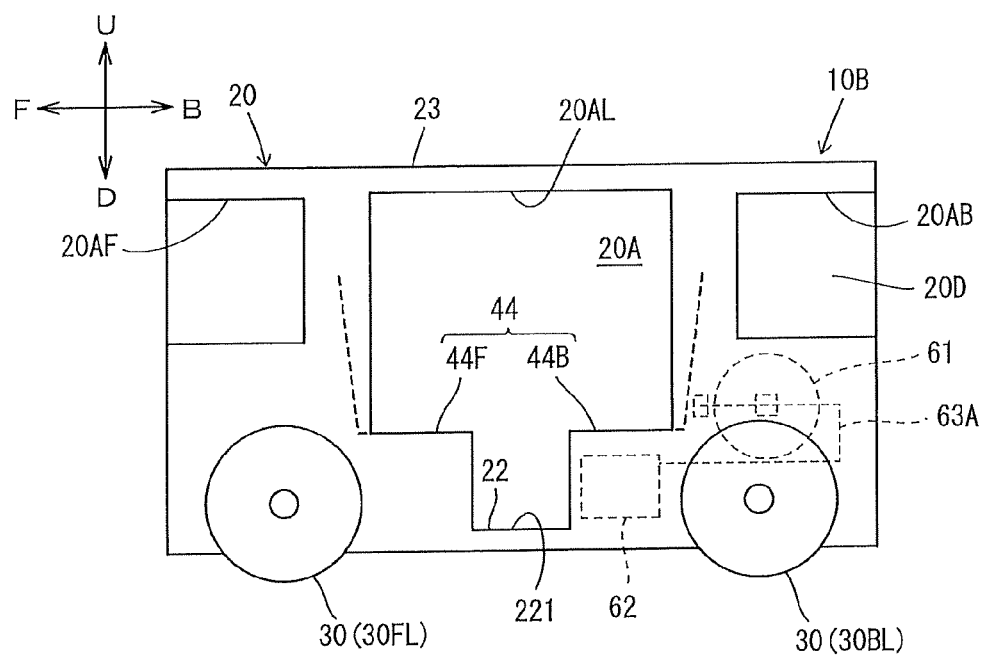
FIG. 15 is a left side view to show an open cabin vehicle according to Variation 2 of an embodiment of the present teaching.

An open cabin vehicle 10B according to Variation 2 of the embodiment of the present teaching will be described with reference to FIG. 15. FIG. 15 is a left side view to show the open cabin vehicle 10B.

As compared with the open cabin vehicle 10A, the open cabin vehicle 10B is provided with a transparent panel 20D at each of the front opening 20AF and the rear opening 20AB. In other words, in the open cabin vehicle 10B, each of the front opening 20AF and the rear opening 20AB is blocked by the transparent panel 20D.

Even in such open cabin vehicle 10B, similar effects as those of the open cabin vehicle 10A can be achieved.

Variation 3 of Embodiment

Figure 16:
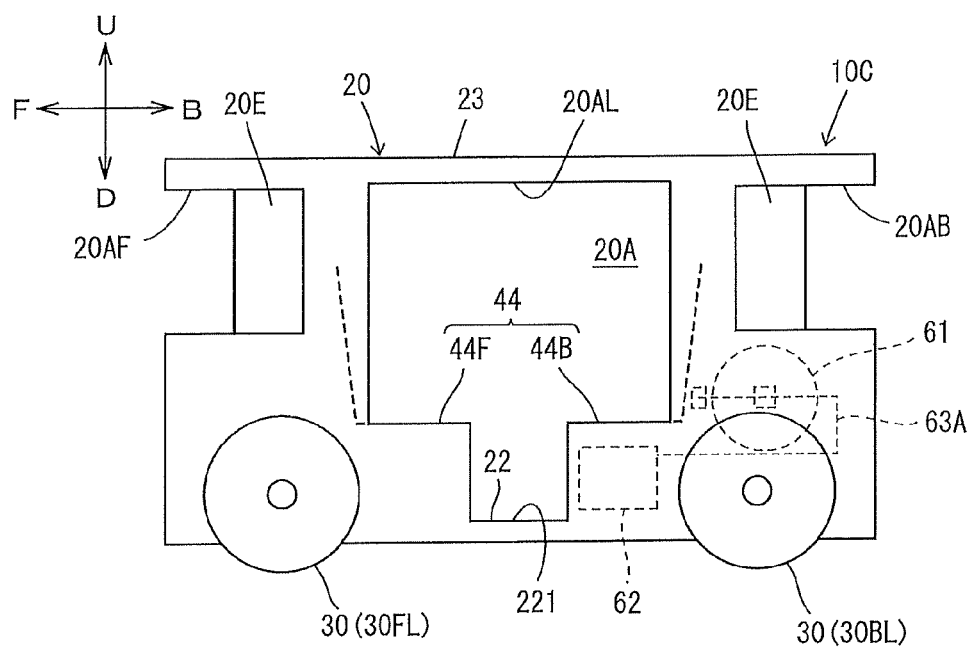
FIG. 16 is a left side view to show an open cabin vehicle according to Variation 3 of an embodiment of the present teaching.

An open cabin vehicle 10C according to Variation 3 of the embodiment of the present teaching will be described with reference to FIG. 16. FIG. 16 is a left side view to show the open cabin vehicle 10C.

As compared with the open cabin vehicle 10A, the open cabin vehicle 10C is provided with a transparent panel 20E so as to block a part of each of the front opening 20AF and the rear opening 20AB.

Even in such open cabin vehicle 10C, similar effects as those in the open cabin vehicle 10A can be achieved.

Variation 4 of Embodiment

Figure 17:
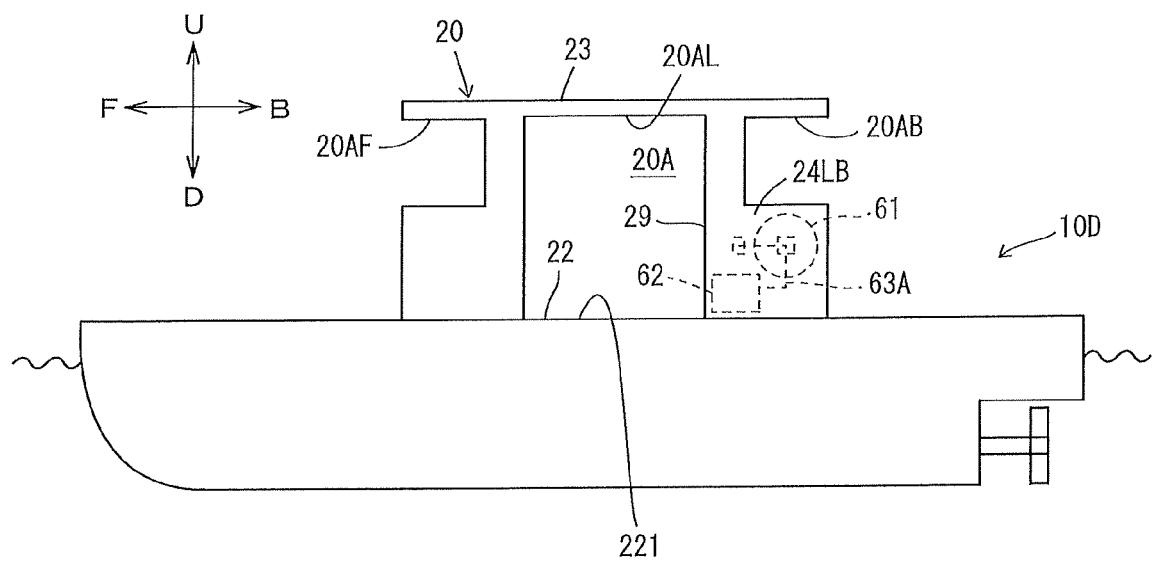
FIG. 17 is a left side view to show an open cabin vehicle according to Variation 4 of an embodiment of the present teaching.

An open cabin vehicle 10D according to Variation 4 of the embodiment of the present teaching will be described with reference to FIG. 17. FIG. 17 is a left side view to show the open cabin vehicle 10D.

The open cabin vehicle 10D is different from the open cabin vehicle 10 in that it is a ship. Further, the open cabin vehicle 10D is different from the open cabin vehicle 10 in that any seat for an occupant to seat is not provided. The open cabin vehicle 10D is different from the open cabin vehicle 10 in that there is provided a back inner panel 29 which is provided between the left-back vehicle-body panel 24LB and the right-back vehicle-body panel 24RB.

In the open cabin vehicle 10D, the hydrogen tank 61, the fuel cell stack 62, and the hydrogen supply pipe 63A for connecting those are disposed farther backward than the back inner panel 29.

In such open cabin vehicle 10D, similar effects as those in the open cabin vehicle 10 can be achieved.

Variation 5 of Embodiment

Figure 18:
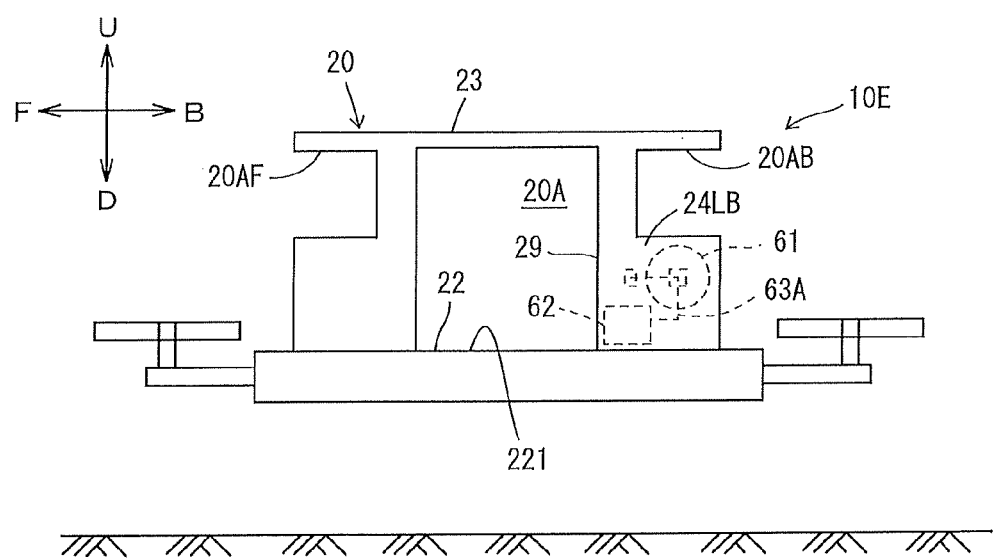
FIG. 18 is a left side view to show an open cabin vehicle according to Variation 5 of an embodiment of the present teaching.

An open cabin vehicle 10E according to Variation 5 of the embodiment of the present teaching will be described with reference to FIG. 18. FIG. 18 is a left side view to show the open cabin vehicle 10E.

The open cabin vehicle 10E is different from the open cabin vehicle 10 in that it is a drone. Further, the open cabin vehicle 10E is different from the open cabin vehicle 10 in that any seat for an occupant to seat is not provided. The open cabin vehicle 10E is different from the open cabin vehicle 10 in that there is provided a back inner panel 29 which is disposed between the left-back vehicle-body panel 24LB and the right-back vehicle-body panel 24RB.

In the open cabin vehicle 10E, the hydrogen tank 61, the fuel cell stack 62, and the hydrogen supply pipe 63A for connecting those are disposed farther backward than the back inner panel 29.

In such open cabin vehicle 10E, similar effects as those of the open cabin vehicle 10 can be achieved.

Variation 6 of the Embodiment

Figure 19:
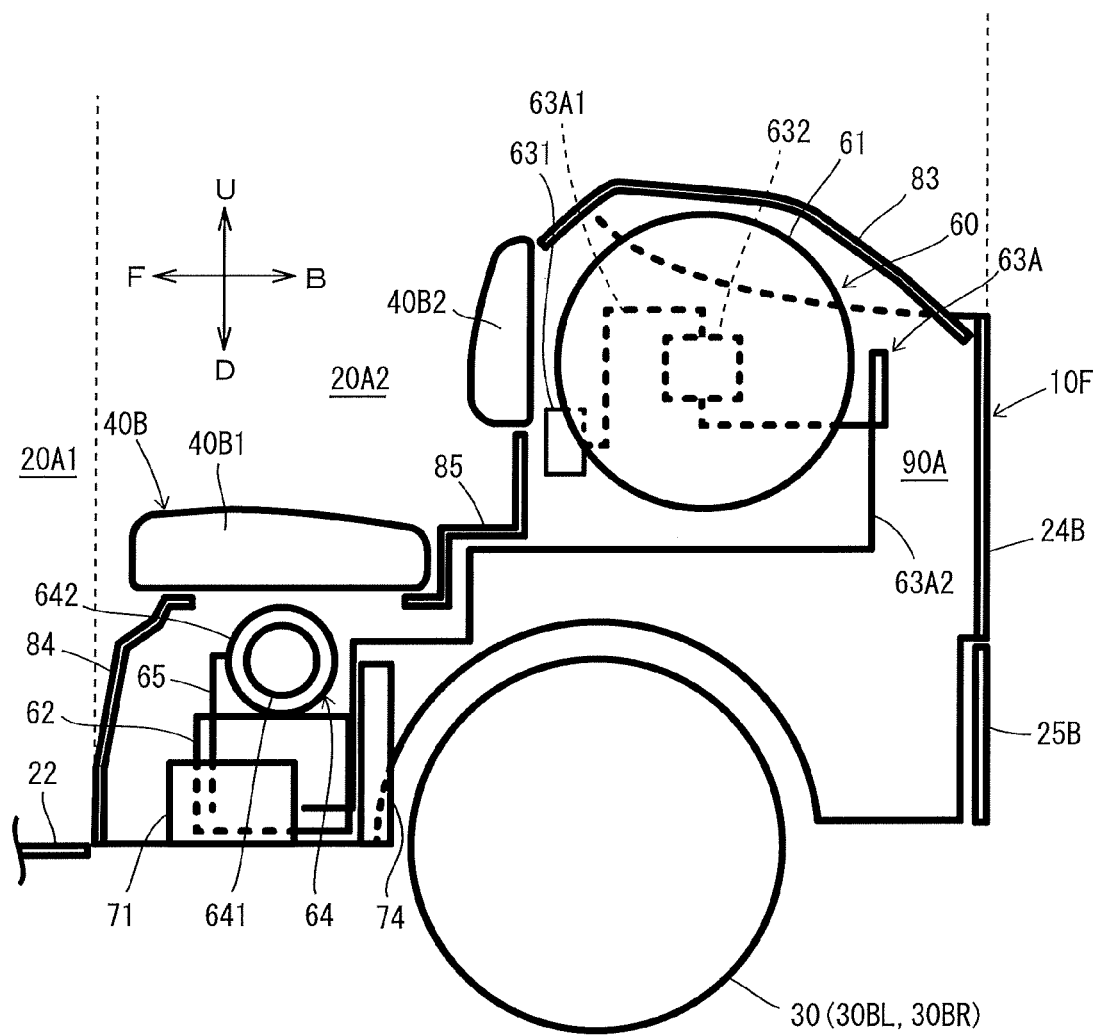
FIG. 19 is a schematic diagram to show arrangement of a fuel cell unit in a fuel-cell-unit arrangement space in an open cabin vehicle according to Variation 6 of an embodiment of the present teaching, in which the arrangement of the fuel cell unit in the fuel-cell-unit arrangement space is shown when the open cabin vehicle is viewed in a rightward direction.

Although the vehicle body 20 includes the roof 23 in the above described embodiment, the vehicle body 20 may not include the roof 23. In this case, as shown in FIG. 19, the fuel-cell-unit arrangement space 90A is provided below a space 20A2 being present continuous with a space 20A1 above the floor 22 in the front-back direction of the open cabin vehicle 10F, and overlapping with the open cabin vehicle 10F as viewed in a downward direction of the open cabin vehicle 10F, and is communicated with a space around the vehicle body 20. In the example shown in FIG. 19, the fuel-cell-unit arrangement space 90A is provided further backward than the floor 22.

Even in such an embodiment, similar effects as those in the above described embodiment can be achieved.

Other Embodiments

The embodiments and variations which have been at least described or illustrated herein are for the purpose of facilitating the understanding of the present disclosure, and are not intended to limit the concept of the present disclosure. The above described embodiments and variations can be modified and improved without departing from the spirit of the invention.

The spirit includes equivalent elements, modifications, deletions, combinations (for example, combinations of features across embodiments and variations), improvements, and alterations that can be recognized by those skilled in the art based on the embodiments disclosed herein. The limitations in the claims should be interpreted broadly based on the terms used in the claims, and should not be limited to the embodiments and variations set forth herein or in the prosecution of the present application. Such embodiments and variations should be construed as non-exclusive. For example, in the present specification, the terms "preferably" and "good" are non-exclusive and mean "preferable but not limited thereto", "good but not limited thereto".

In the above-described embodiments, the number of wheels may not be four.

In the above described embodiments, the fuel cell unit 60 may not be disposed in each of a space located farther downward than the rear seat 40B and a space located farther backward than the rear seat 40B. For example, the fuel cell unit 60 may be disposed only in the space behind the rear seat 40B, or may be disposed only in the space below the rear seat 40B. Alternatively, the fuel cell unit 60 may be disposed below the two front seats 40FL and 40FR.

In Variation 1 of the above described embodiment, the fuel cell unit 60 may be disposed, for example, below the front seat 44F. In this case, when the open cabin vehicle 10A advances in the right direction in FIG. 14, the fuel cell unit 60 will be disposed behind the front seat 44F in the direction in which the open cabin vehicle 10A advances.

Although a seat in which an occupant can be seated is provided in the above described embodiments, for example, any seat in which an occupant can be seated may not be provided. Such an open cabin vehicle is used, for example, for carrying a load by automatic or autonomous driving.

Figure 20:
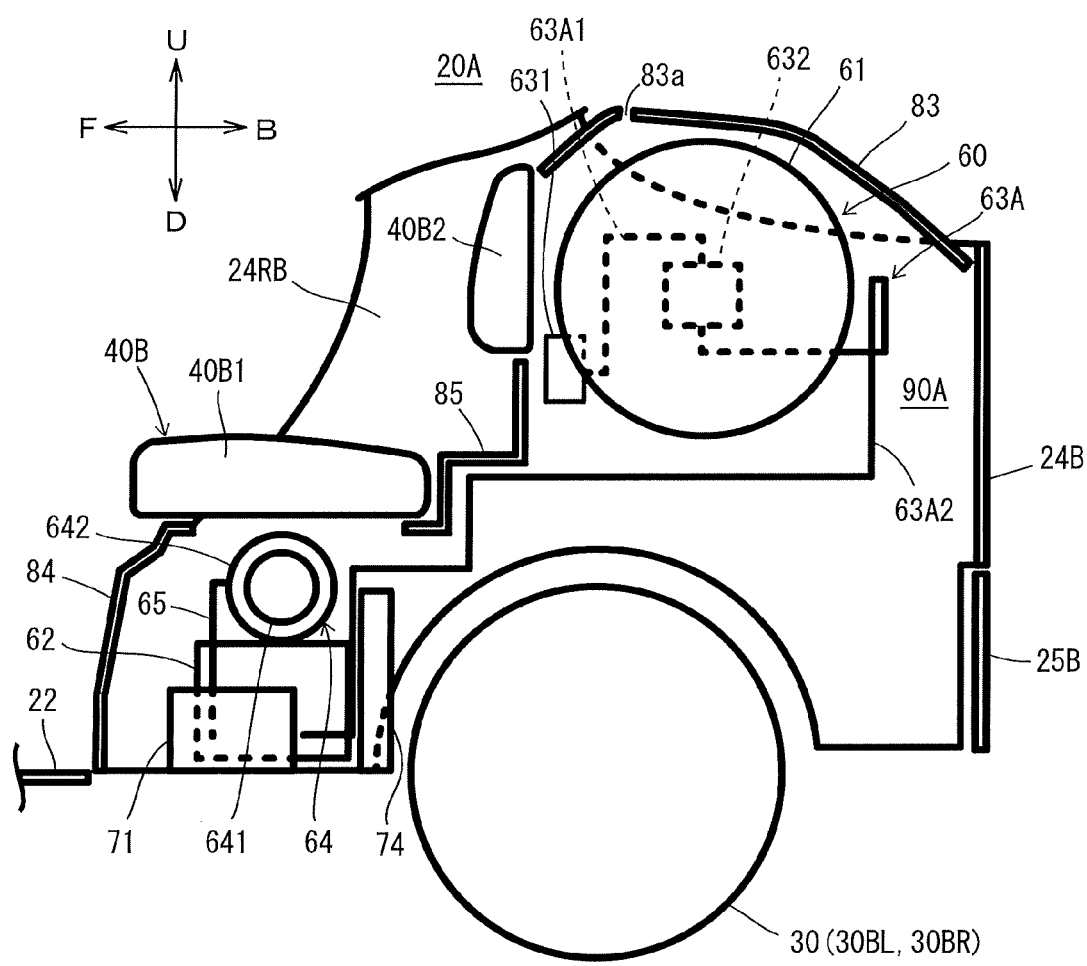
FIG. 20 is a schematic diagram to show arrangement of a fuel cell unit in a fuel-cell-unit arrangement space in an open cabin vehicle according to an embodiment of the present teaching, in which a cover provided with a communication hole is shown.

In the above described embodiments, as shown in FIG. 20, the cover 83 may be formed with a communication hole 83a that allows communication between the fuel-cell-unit arrangement space 90A and the vehicle-body inner space 20A. The communication hole is formed, for example, at the highest position in the cover 83. Thus, in case of accidental hydrogen leakage, the leaked hydrogen becomes more likely to be diffused into the vehicle-body outer space 20B via the vehicle-body inner space 20A after being discharged from the fuel-cell-unit arrangement space 90A.

In the above described embodiments, the rear end of the lower surface of the roof 23 (the surface defining the upper end of the vehicle-body inner space 20A) may be located higher than the front end of the lower surface. In such an aspect, in case of accidental hydrogen leakage, it will become easy to make the leaked hydrogen flow backward.

REFERENCE SIGNS LIST

10 Open cabin vehicle
20 Vehicle body
20A Vehicle-body inner space
20AL Left entrance
20AR Right entrance
20AF Front opening
20AB Rear opening
20B Vehicle-body outer space
20C Front transparent panel
22 Floor
221 Floor surface
221F Front floor surface
221B Back floor surface
23 Roof
24L Left vehicle-body panel
24LF Left-front vehicle-body panel
24LB Left-back vehicle-body panel
24R Right vehicle-body panel
24RF Right-front vehicle-body panel
24RB Right-back vehicle-body panel
24F Front vehicle-body panel
24B Back vehicle-body panel
25B Rear bumper
26 Inner-front panel
30 Wheel
30FL Left-front wheel
30FR Right-front wheel
30BL Left-rear wheel
30BR Right-rear wheel
40 Seat
40FL Left-front seat
40FR Right-front seat
40F1 Seating part
40F2 Backrest part
40B Rear seat
40B1 Seating part
40B2 Backrest part
50 Electric motor
60 Fuel cell unit
61 Hydrogen tank
62 Fuel cell stack
63A Hydrogen supply pipe
64 Oxygen supply apparatus
65 Oxygen supply pipe
83 Cover
83a Hole in cover
90 Fuel-cell-unit-arrangement-space forming wall part
90A Fuel-cell-unit arrangement space

What is claimed is:
1. An open cabin vehicle comprising:
a vehicle body including a floor formed to lead to an entrance having no door, and a roof disposed farther upward than the floor, wherein the vehicle body forms a vehicle-body inner space, the vehicle-body inner space being defined at an upper end by the roof, capable of accommodating an occupant and/or a luggage, and being open to a vehicle-body outer space which is a space around the vehicle body;
an electric motor for providing driving force to the vehicle body;
a fuel cell unit including a hydrogen tank for storing hydrogen, a fuel cell stack which uses as fuel the hydrogen stored in the hydrogen tank, and a hydrogen supply pipe for connecting the hydrogen tank with the fuel cell stack, wherein the fuel cell unit generates electric power to be supplied to the electric motor; and
a fuel-cell-unit-arrangement-space forming wall part defining a fuel-cell-unit arrangement space, as viewed in an upward direction or a downward direction of the open cabin vehicle, such that the hydrogen tank, the fuel cell stack, and the hydrogen supply pipe are disposed in the fuel-cell-unit arrangement space, wherein the fuel-cell-unit arrangement space is provided below a portion of the vehicle-body inner space farther backward than at least a part of the floor, and the fuel-cell-unit arrangement space bordering the vehicle-body inner space, thereby being connected to the vehicle-body outer space, which is a space around the vehicle body, via the vehicle-body inner space, wherein
an upper end of each of the hydrogen tank, the fuel cell stack, and the hydrogen supply pipe is located farther upward than the floor in a state in which the hydrogen tank, the fuel cell stack, and the hydrogen supply pipe are disposed in the fuel-cell-unit arrangement space.

2. The open cabin vehicle according to claim 1, wherein at least one of the hydrogen tank, the fuel cell stack, and the hydrogen supply pipe has a lower end located farther upward than the floor.

3. The open cabin vehicle according to claim 2, wherein a lower end of each of the hydrogen tank, the fuel cell stack, and the hydrogen supply pipe is located farther upward than the floor.

4. The open cabin vehicle according to claim 1, further comprising
a seat disposed farther upward than the floor and is to be seated by the occupant, wherein
the fuel-cell-unit arrangement space is formed farther backward than a portion of the floor with which a foot of the occupant seated in the seat is contactable.

5. The open cabin vehicle according to claim 4, wherein at least one of the hydrogen tank, the fuel cell stack, and the hydrogen supply pipe is disposed below the seat.

6. The open cabin vehicle according to claim 5, wherein at least one of the fuel cell stack and the hydrogen supply pipe is disposed below the seat.

7. The open cabin vehicle according to claim 4, wherein the hydrogen tank is disposed farther backward than the seat.

8. The open cabin vehicle according to claim 7, wherein an upper end of the hydrogen tank is located farther upward than a seating part of the seat in which the occupant is seated.

9. The open cabin vehicle according to claim 7, further comprising
a cover which is disposed above the hydrogen tank to separate the fuel-cell-unit arrangement space from the vehicle-body inner space.

10. The open cabin vehicle according to claim 9, wherein the cover is formed with a communication hole which allows communication between the fuel-cell-unit arrangement space and the vehicle-body inner space.

11. The open cabin vehicle according to claim 1, further comprising
a wheel which is rotated by power being transferred from the electric motor.

12. The open cabin vehicle according to claim 11, wherein an upper end of the hydrogen tank is located farther upward than the wheel as viewed in the leftward direction or the rightward direction of the open cabin vehicle.

13. The open cabin vehicle according to claim 12, wherein a lower end of the hydrogen tank is located farther upward than the wheel as viewed in the leftward direction or the rightward direction of the open cabin vehicle.

14. The open cabin vehicle according to claim 13, wherein the hydrogen tank is located above the wheel as viewed in the leftward direction or the rightward direction of the open cabin vehicle.

15. The open cabin vehicle according to claim 14, wherein a front end of the hydrogen tank is located farther frontward than the rear end of the wheel, and located farther backward than the front end of the wheel.

16. The open cabin vehicle according to claim 11, wherein an upper end of the wheel is located farther upward than the floor as viewed in the leftward direction or the rightward direction of the open cabin vehicle.

17. The open cabin vehicle according to claim 11, wherein the wheel is a rear wheel which is disposed at a rear part of the open cabin vehicle.

18. An open cabin vehicle, comprising:
a vehicle body including a floor formed to lead to an entrance having no door;
an electric motor for providing driving force to the vehicle body;
a fuel cell unit including a hydrogen tank for storing hydrogen, a fuel cell stack which uses as fuel the hydrogen stored in the hydrogen tank, and a hydrogen supply pipe for connecting the hydrogen tank with the fuel cell stack, wherein the fuel cell unit generates electric power to be supplied to the electric motor; and
a fuel-cell-unit-arrangement-space defining a fuel-cell-unit arrangement space, as viewed in an upward direction or a downward direction of the open cabin vehicle, disposed so as to surround the hydrogen tank, the fuel cell stack, and the hydrogen supply pipe, wherein the fuel-cell-unit arrangement space is provided below a space being present continuous with a space above the floor in the front-back direction of the open cabin vehicle, and overlapping with the open cabin vehicle as viewed in a downward direction of the open cabin vehicle, the fuel-cell-unit arrangement space bordering a space around the vehicle body, wherein
an upper end of each of the hydrogen tank, the fuel cell stack, and the hydrogen supply pipe is located farther upward than the floor in a state in which the hydrogen tank, the fuel cell stack, and the hydrogen supply pipe are disposed in the fuel-cell-unit arrangement space, wherein the fuel-cell-unit arrangement space is provided below a space being present continuous with a space above the floor in the front-back direction of the open cabin vehicle, and overlapping with the open cabin vehicle as viewed in a downward direction of the open cabin vehicle and borders the space around the vehicle body.

19. The open cabin vehicle according to claim 18, wherein the fuel-cell-unit arrangement space is provided farther backward than the floor.

* * * * *